United States Patent
Agur et al.

[19]

[11] Patent Number: 6,106,762
[45] Date of Patent: Aug. 22, 2000

[54] PROCESSES FOR FORMING POLYMERIC SEAMLESS BELTS AND IMAGING MEMBERS

[75] Inventors: Enno E. Agur, Toronto; Douglas J. Weatherall, Downsview; Ellis Fabian, North York, all of Canada

[73] Assignee: Xerox Corporation, Stamford, Conn.

[21] Appl. No.: 07/905,698

[22] Filed: Jun. 29, 1992

Related U.S. Application Data

[62] Division of application No. 07/660,365, Feb. 25, 1991, Pat. No. 5,128,091.

[51] Int. Cl.$^7$ .................................................. B29C 49/64
[52] U.S. Cl. ........................ 264/512; 264/532; 264/544; 264/901; 264/904
[58] Field of Search ...................... 264/512, 513, 264/515, 129, 159, 523, 532, 536, 537, 540, 235, 346, 901, 904; 427/458, 469, 482, 74, 76, 108, 402, 419.1, 419.2, 419.5; 355/212; 430/126

[56] References Cited

U.S. PATENT DOCUMENTS

| | | | |
|---|---|---|---|
| 3,839,078 | 10/1974 | Birchall et al. | 427/377 |
| 3,914,472 | 10/1975 | Nakanishi et al. | 427/250 |
| 4,105,449 | 8/1978 | Tanei et al. | 264/211 |
| 4,357,288 | 11/1982 | Oas et al. | 264/406 |
| 4,385,089 | 5/1983 | Bonnebat et al. | 264/523 |
| 4,390,683 | 6/1983 | Yatsu et al. | 528/194 |
| 5,039,598 | 8/1991 | Abramsohn et al. | 430/347 |
| 5,172,173 | 12/1992 | Goto et al. | 355/275 |

FOREIGN PATENT DOCUMENTS

| | | |
|---|---|---|
| 0283604 | 9/1988 | European Pat. Off. . |
| 2476536 | 8/1981 | France . |
| 60-179239 | 2/1986 | Japan . |
| 62-32482 | 2/1987 | Japan ...................................... 355/212 |
| 2234183 | 9/1990 | Japan ...................................... 355/212 |
| 305074 | 6/1971 | Russian Federation . |
| 716848 | 2/1980 | Russian Federation . |
| 2188001 | 9/1987 | United Kingdom . |

*Primary Examiner*—Catherine Timm
*Attorney, Agent, or Firm*—Judith L. Byorick

[57] ABSTRACT

A process which entails providing a preform formulated of polymeric material formed to permit the introduction of a fluid under pressure into the preform, heating the preform to a temperature at or above the glass transition temperature of the polymeric material and below the melting temperature of the polymeric material, placing the heated preform into a substantially cylindrical mold with a polished seamless inside surface, introducing a fluid under pressure into the heated preform while maintaining the preform axially centered in the mold, thereby causing the preform to expand without contacting the mold surface, subsequently causing the preform to expand until it contacts the mold surface, heating the expanded preform to an appropriate heat setting temperature above the stretching temperature and below the melting temperature of the polymeric material while maintaining fluid pressure, and subsequently cooling the set preform, resulting in formation of a biaxially oriented seamless belt. The thin walled, high surface quality biaxially oriented seamless belt thus formed is then either used as a substrate for an electrophotographic or ionographic imaging member or used as a paper handling belt in the document handler of an electrophotographic copier.

15 Claims, 6 Drawing Sheets

PROCESSES FOR FORMING POLYMERIC SEAMLESS BELTS AND IMAGING MEMBERS

This is a division of application Ser. No. 07/660,365, filed Feb. 25, 1991 now U.S. Pat. No. 5,128,091.

BACKGROUND OF THE INVENTION

The present invention is directed to a process for forming polymeric seamless belts. More specifically, the present invention is directed to a process for forming biaxially oriented polymeric seamless or endless belts by a stretch blow molding process followed by heat setting and cooling of the resulting belt. One embodiment of the present invention is directed to a process which comprises providing a preform comprising a polymeric material, heating the preform to an appropriate stretching temperature at or above the glass transition temperature of the polymeric material and below the melting temperature of the polymeric material, placing the heated preform into a substantially cylindrical mold with a polished seamless inside surface, introducing a fluid under pressure into the heated preform while maintaining the preform axially centered in the mold, thereby causing the preform to expand both axially and radially without contacting the mold surface, subsequently causing the preform to expand until it contacts the mold surface, heating the expanded preform to an appropriate heat setting temperature above the stretching temperature and below the melting temperature of the polymeric material while maintaining fluid pressure, and subsequently cooling the set preform. Another embodiment of the present invention is directed to a process for preparing an electrophotographic imaging member which comprises preparing a seamless belt by the process of the present invention as detailed herein and coating onto the seamless belt a layer of a photogenerating material. Yet another embodiment of the present invention is directed to a process for preparing a dielectric receiver suitable as an imaging member for Monographic imaging processes.

Imaging members for electrophotographic imaging systems comprising selenium alloys vacuum deposited on rigid aluminum substrates are known. These imaging members require elaborate, highly sophisticated, and expensive equipment for fabrication. Imaging members have also been prepared by coating rigid substrates with photoconductive particles dispersed in an organic film forming binder. Coating of rigid drum substrates has been effected by various techniques such as spraying, dip coating, vacuum evaporation, and the like. Rigid drum imaging members, however, limit apparatus design flexibility, are less desirable for flash exposure, and are expensive. Flexible organic imaging members are manufactured by coating a web and thereafter shearing the web into segments which are then formed into belts by welding opposite ends of the sheared web. The resulting welded seam on the imaging member, however, disrupts the continuity of the outer surface of the imaging member and must be indexed so that it does not print out during an imaging cycle. Efficient stream feeding of paper and throughput are thus adversely affected because of the necessity to detect a seam within the length of each sheet of paper. The mechanical and optical devices required for indexing add to the complexity and the cost of copiers, duplicators, and printers, and reduce the flexibility of design. Welded belts are also less desirable for electrophotographic imaging systems because the seam forms a weak point in the belt and collects toner and paper debris during cleaning, particularly with wiper blade cleaning devices. Accordingly, seamless belts suitable as substrates for electrophotographic or ionographic imaging members are particularly desirable.

In addition, seamless belts for use in document handling systems in printing, copying, and duplicating apparatuses are particularly desirable. Document handler belts with seams tend to accumulate dirt in the seam area, thus necessitating frequent cleaning. When the document handler belts are in high volume copiers or duplicators generating over 100 copies per minute, it may be necessary to clean the document handler belt seams frequently. In addition, the seam of a document handler belt can provide a weak point with respect to belt breakage. Thus, a seamless document handler belt is desirable to reduce dirt build up on the belt and to reduce belt breakage.

Processes for forming biaxially oriented products by blow molding processes are known. For example, Soviet Union Inventor's Certificate 716,848 discloses a method for making drive belts from plastic-based materials by molding blanks from granules of polyethylene terephthalate and blowing the blank in a mold so that the material is subject to biaxial orientation in mutually perpendicular directions, followed by thermally fixing the belt in a liquid-heat-carrier medium and cutting the tubular blank. According to this reference, the quality of the article is increased, on account of stabilizing the coefficient of orientation of the blank along its length, by carrying out the blowing while additionally limiting its size from below by using a bottom attachment to regulate the height. Additionally, Soviet Union Inventor's Certificate No. 305,074 discloses a method for the manufacture of drive belts which comprises molding a workpiece from polyethylene terephthalate resin granules, placing the workpiece in a mold, placing the mold containing the workpiece into a liquid heat carrier, introducing an inert gaseous heat carrier under pressure into the inner cavity of the workpiece heated to a state of softness to inflate the workpiece to the dimensions of the mold, and thermally fixing the inflated workpiece in the liquid heat carrier medium. The cylindrical portion of the inflated balloon is then cut into rings of required width.

In addition, U.S. Pat. No. 2,335,978 (Vogt), the disclosure of which is totally incorporated herein by reference, discloses a method of making containers such as flexible bags and liners for cartons. The method entails applying localized heat to the exterior surfaces of the wall portions of a container consisting of a flexible, thermoplastic sheet material which, when heated and rendered plastic, may be stretched lengthwise of the container and expanded circumferentially to increase its superficial area and which when again cooled will to a large degree retain its expanded condition. Application of heat softens the walls of the container, and a fluid pressure is subsequently applied within the container and a force is applied lengthwise to expand and lengthen the walls and increase their superficial area. Subsequently, the container is cooled in its expanded condition.

Further, U.S. Pat. No. 3,910,743 (Farrell), the disclosure of which is totally incorporated herein by reference, discloses an injection blow molding process wherein a semi-liquid and molten plastic is injected into a cavity into which a core rod extends. The molten plastic is discharged into the mold cavity and the material spreads in all directions around the core rod to fill the cavity and form a parison around the core rod. The core rod can be covered with an elastomer material which forms a balloon that hugs the core rod when the balloon is deflated. After a parison has been applied over the core rod, the core rod is withdrawn from the injection mold. Subsequently, the parison is blown by blowing into the parison or the balloon. According to the teachings of this patent, the plastic is injected into the cavity of the injection mold at the neck end of the core rod, and the application of the plastic to the surface of the core rod is then controlled by having a tube which surrounds the core rod and which fills most of the injection mold cavity. As the plastic material enters the mold cavity, the tube is withdrawn and the plastic material contacts the end face of the tube and advances as the tube withdraws so as to apply the plastic material to the core rod as a wave of plastic which rolls down the length of the core rod as the tube withdraws. U.S. Pat. No. 3,936,260 (Farrell), the disclosure of which is totally incorporated herein by reference, also discloses an injection blow molding process wherein the length to diameter ratio of plastic articles made on injection molding machines is increased without using long and relatively thin core rods. The first part of the blowing operation stretches the parison lengthwise before there is any substantial displacement of the parison in a radial direction. At the start of the blowing operation, a tube surrounds and confines radial expansion of the parison, but the tube is withdrawn progressively as the blowing operation continues. U.S. Pat. No. 4,363,619 (Farrell), the disclosure of which is totally incorporated herein by reference, discloses an apparatus and method for making a wide mouth container by an injection blow molding process wherein substantially the entire container is multiaxially oriented in its formation.

Additionally, European Patent Document 12, 481 (Neundorf et al.) discloses a hollow molding manufacturing process from partially crystalline polypropylene or ethylene propylene copolymers. The process is carried out in one stage in the presence of benzoic acid, and entails cooling the parison to a temperature 10 to 60° C. below the melting range of the polymer and then reheating to the usual stretching temperature of 1 to 20° C. below the melting range and molding to a hollow body by biaxial stretching.

In addition, British Patent 2,089,276 (Reed et al.), U.S. Pat. No. 4,447,199 (Reed et al.), and U.S. Pat. No. 4,547,416 (Reed et al.), the disclosures of each of which are totally incorporated herein by reference, disclose a process for making biaxially oriented tubular articles which will provide bodies for processable food containers. The articles are made from an elongate tube of thermoplastic material as it emerges from an extruder. The process entails repeatedly performing a cycle which comprises engaging the tube by a first clamping means over a first region at a leading end of the tube and by a second clamping means over a second region at a spacing from the first region, so as to define between clamping regions a portion of the tube to be longitudinally stretched and radially expanded; moving the clamping means apart to stretch the tube portion longitudinally and admitting pressure fluid to the tube portion to expand it radially and form a bubble of biaxially oriented thermoplastic material adjacent to the leading end of the tube; and severing at least a substantial portion of the bubble from the tube to form the tube with a new end as the leading end of the tube for the succeeding cycle. U.S. Pat. No. 4,735,538 (Reed et al.) discloses a process of forming biaxially oriented tubular articles by repeating a cycle which comprises engaging a thermoplastic tube by a first clamping member over a first region at a trailing end of the tube and engaging the tube by a second clamping mechanism over a second region at a spacing from the first region so as to define between the clamping mechanisms a portion of the tube to be longitudinally stretched and radially expanded; admitting pressure fluid into the tube portion to expand it radially and form a biaxially oriented bubble adjacent to the leading end of the tube; and severing a substantial part, but not all, of the bubble from the tube to form the tube with a radially outwardly flared end as the leading end of the tube for the succeeding cycle.

Further, U.S. Pat. No. 4,499,045 (Obsomer), the disclosure of which is totally incorporated herein by reference, discloses a process for the production of tubes of a molecularly oriented plastic which comprises heating a plastic tube to a temperature at which stretching induces a molecular orientation and clamping a portion of the tube in a sleeve, followed by introducing a fluid under pressure into the portion of tube and moving the sleeve along the portion of the tube to cause its progressive radial expansion until it makes contact with a mold.

Additionally, U.S. Pat. No. 4,632,656 (Eyeglaar et al.) discloses an apparatus for manufacturing molecularly oriented plastic pipes. The apparatus includes a tubular mold of transverse dimensions equal to those of the pipe to be produced and equipped with a device for admitting a fluid under pressure into a region intended to receive the pipe section to be expanded. The apparatus also includes a member for closing and grasping one end of the pipe section of a tubular sleeve which opens into the mold by an end away from the closing and grasping member, the transverse dimensions of which correspond to those of the pipe section, and a means for causing a controlled relative axial displacement of the sleeve in relation to the closing and grasping member in which the open end of the sleeved is equipped with an annular plunger incorporating a surface of a frustoconical shape extending toward the inner wall of the mold and widened out in a direction away from the closing and grasping member. The apparatus produces pipe sections oriented in a reproducible manner and especially suitable for the construction of pipelines for fluids under pressure.

In addition, U.S. Pat. No. 3,733,309 (Wyeth et al.), the disclosure of which is totally incorporated herein by reference, discloses a hollow, biaxially oriented thermoplastic article, particularly a bottle, prepared from polyethylene terephthalate wherein the article has an inherent viscosity of at least 0.55, a density of about 1.331 to 1.402, and a ratio of article weight in grams to volume in cubic centimeters of about 0.2 to 0.005:1. If desired, the article thus formed can be heat set to achieve a uniform crystallinity in each article.

Also of interest are the following references: "Biaxially Oriented Polyethylene Terephthalate Bottles: Effects of Resin Molecular Weight on Parison Stretching Behavior," C. Bonnebat et al., *SPE ANTEC Technical Papers*, vol. 25, page 273 (1979); "Biaxially Oriented Poly(Ethylene Terephthalate) Bottles: Effects of Resin Molecular Weight on Parison Stretching Behavior," C. Bonnebat et al., *Polym. Eng. Sci.*, vol. 21, no. 4, page 189 (1981); "Blowing of Oriented PET Bottles: Predictions of Free Blown Size and Shape," L. Erwin et al., *Polym. Eng. Sci.*, vol. 23, page 826 (1983); "Stretch Blow Molding," S. L. Belcher, *Modern Plastics Encyclopedia*, vol. 64, page 206 (1987); "A Survey of Film Processing Illustrated With Poly(Ethylene Terephthalate)", *Polym. Eng. Sci.*, vol.18, no. 15, page 1163 (1978); D. V. Rosato and D. V. Rosato (Eds.), *Blow Molding Handbook* (1989); and "Meet 'COFO', a New Way to Make Multi-layer Parts," O. G. Raspor and J. Eichhorn, *Plastics World*, February 1988, page 44. The disclosures of each of these references are totally incorporated herein by reference.

Although known molding processes are suitable for their intended purposes, a need remains for processes for preparing seamless belts suitable for electrophotographic and ionographic applications. In addition, a need continues to remain for processes for preparing seamless belts with excellent tensile strength. A need also exists for processes for preparing seamless belts with excellent thickness tolerances. Further, there is a need for processes for preparing seamless belts with multi-layer structures and excellent thickness tolerances for the layers. There is also a need for processes for preparing seamless belts with excellent surface uniformity. Additionally, a need exists for processes for preparing seamless belts that do not undergo any substantial degree of deformation upon being heated. Further, there is a need for processes for preparing seamless belts that are substantially transparent and exhibit little or no hazing as a result of the belt formation process. In addition, there is a need for stretch blow molding processes that enable preparation of seamless belts with a thickness of less than 0.010 inch, and frequently as low as 0.001 inch. A need also remains for processes for preparing seamless belts that are suitable as photoreceptor substrates and as document handler belts that exhibit reliability and require less frequent cleaning, thereby reducing costs. There is also a need for processes for preparing seamless belts with high surface quality in that the surfaces are smooth and free of defects.

SUMMARY OF THE INVENTION

It is an object of the present invention to provide a process for preparing seamless belts suitable for electrophotographic and Monographic applications.

It is another object of the present invention to provide a process for preparing seamless belts with excellent tensile strength.

It is yet another object of the present invention to provide a process for preparing seamless belts with excellent thickness tolerances.

It is still another object of the present invention to provide a process for preparing seamless belts with multi-layer structures and excellent thickness tolerances for the layers.

Another object of the present invention is to provide a process for preparing seamless belts with excellent surface uniformity.

Yet another object of the present invention is to provide a process for preparing seamless belts that do not undergo any substantial degree of deformation upon being heated.

Still another object of the present invention is to provide a process for preparing seamless belts that are substantially transparent and exhibit little or no hazing as a result of the belt formation process.

It is another object of the present invention to provide stretch blow molding processes that enable preparation of seamless belts with a thickness of less than 0.010 inch, and frequently as low as 0.001 inch.

It is yet another object of the present invention to provide processes for preparing seamless belts that are suitable as photoreceptor substrates and as document handler belts that exhibit reliability and require less frequent cleaning, thereby reducing costs.

It is still another object of the present invention to provide processes for preparing seamless belts with high surface quality in that the surfaces are smooth and free of defects.

These and other objects of the present invention (or specific embodiments thereof) can be achieved by providing a process which comprises providing a preform comprising a polymeric material, heating the preform to an appropriate stretching temperature at or above the glass transition temperature of the polymeric material and below the melting temperature of the polymeric material, placing the heated preform into a substantially cylindrical mold with a polished seamless inside surface, introducing a fluid under pressure into the heated preform while maintaining the preform axially centered in the mold, thereby causing the preform to expand both axially and radially without contacting the mold surface, subsequently causing the preform to expand until it contacts the mold surface, heating the expanded preform to an appropriate heat setting temperature above the stretching temperature and below the melting temperature of the polymeric material while maintaining fluid pressure, and subsequently cooling the set preform. Alternatively, instead of stretching the preform both axially and radially by pressure from the fluid, the preform can be first stretched mechanically in the axial direction by any appropriate means, such as a stretching pin or the like, followed by stretching the preform radially by fluid pressure. Subsequently, the resulting film can be removed from the mold and cut to produce a belt of the desired width.

DETAILED DESCRIPTION OF THE INVENTION

Figure 1A:
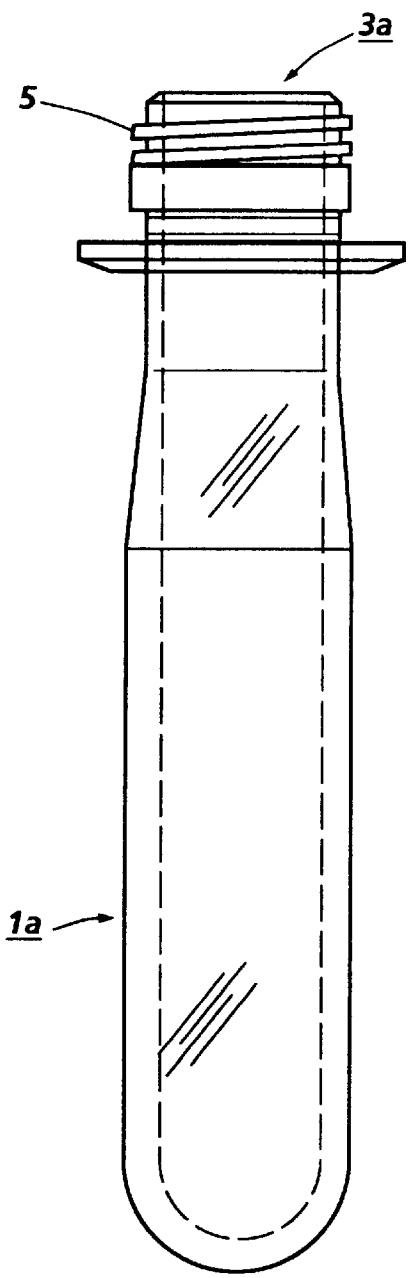
FIGS. 1A, 1B, 1C and 1D illustrate schematically four preforms suitable for the process of the present invention.

The process of the present invention entails the formation of a seamless endless belt by expanding a preform in a seamless mold by the introduction into the preform of a fluid under pressure. The preform can comprise any material desired for the final belt product. For example, when the seamless belt prepared according to this process is intended for use as an imaging member substrate or for use as a belt in a document handler on a copier or duplicator, the desired material can be any polymeric material suitable for this function and suitable for the process of the present invention. Examples of suitable materials include polyethylene terephthalate (PET), polypropylene, polyvinyl chloride (PVC), polystyrene, polyacrylonitrile and polyacetals, as well as other orientable polymers such as polyamides, polyether ether ketone (PEEK), polyesters other than PET, and the like, as well as mixtures thereof.

In addition, various fillers can be included in the polymeric material of the preform. For example, when a conductive belt is desired for use as an imaging member layer, the polymeric material can contain any suitable conductive material, such as conductive carbon black, carbon fibers, stainless steel fibers, magnetite, nickel, graphite fibers coated with a conductive material such as nickel, glass fibers coated with a conductive material, electroconductive tin oxide powders, or the like, as well as mixtures thereof, in any effective or desired amount. Conductive belts are prepared according to the process of the present invention wherein the conductive filler is present in any effective amount, typically from about 2 to about 30 percent by weight, and preferably from about 10 to about 15 percent by weight, although the amount can be outside of this range. Fillers can also be employed for other purposes, such as to impart color to the belt, structural reinforcement, reduced triboelectric charging, or the like. Examples of fillers suitable for these purposes include pigments such as titanium dioxide ($TiO_2$), barium sulfate ($BaSO_4$), mixtures of $TiO_2$ and $BaSO_4$, and the like as a whitener, glass fibers as reinforcement, antistatic agents for reduced triboelectric charging, such as combined neoalkoxy organometallics, including combined neoalkoxy titanates and combined neoalkoxy zirconates, hygroscopic surfactants, such as tertiary fatty amines and their quaternary ammonium salts, such as trilaurylammonium stearate, monoacyl glycerides, such as glycerol monostearate, monoalkyl phosphates, such as stearyl phosphate, sulfonamides, such as dodecylbenzenesulfonamide, conductive particles in low concentrations, typically from 4 to 60 percent by weight conductor in the polymer, metalocenes, such as bis(methyl) cyclopentadianyl cobalt and its analogs, and the like. Fillers of this type are present in any effective or desired amount, generally from about 0.1 to about 40 percent by weight, and preferably from about 0.5 to about 10 percent by weight.

Further, the preform can be a multi-layered structure wherein each layer is of a relative thickness with respect to the other layers that corresponds to the desired relative thicknesses of these layers in the final seamless belt prepared according to the present invention. Thus, by employing a multi-layered preform, a multi-layered seamless belt can be prepared. The resulting seamless belt will have layers with relative thicknesses in the same ratio with respect to each other as the relative thicknesses of the layers in the preform. For example, a substantially cylindrical preform comprising an inner layer of a conductive material such as polyethylene terephthalate containing, for example, about 15 percent by weight of conductive carbon black and an outer layer about 5 times as thick as the inner layer of an insulating material such as polyethylene terephthalate containing no conductive fillers can be processed according to the present invention to result in a seamless belt comprising an inner conductive layer and an outer insulating layer about 5 times as thick as the conductive layer which can be employed as a substrate in an electrophotographic imaging member, as a dielectric receiver for an ionographic or electrographic imaging process, or the like.

The preform can be prepared by any suitable process. For example, the preform can be prepared by injection molding as described in, for example, U.S. Pat. No. 3,910,743, U.S. Pat. No. 3,936,260, and U.S. Pat. No. 4,363,619, the disclosures of each of which are totally incorporated herein by reference. Injection molding generally entails introducing the molten polymeric material into a mold of the desired shape, allowing the polymeric material to solidify, and removing the solid product from the mold. Preferably, the injection mold is seamless in nature, since it is believed that surface imperfections on the preform caused by the injection mold tend to be stretched out somewhat during the expansion process but may not be totally eliminated. In addition, the preform can be prepared by extrusion processes, such as those described in, for example, U.S. Pat. No. 4,698,196, the disclosure of which is totally incorporated herein by reference. Generally, the extrusion process entails introducing the molten polymeric material into a mold or die comprising an annular space between an inner cylindrical surface and an outer cylindrical surface, extruding the material in tubular form from the annular space while preventing collapse of the tube walls while the polymeric material is cooling and solidifying, and recovering the cooled, solidified polymeric material in tubular form. The tube can be pulled over a sizing disk coaxial with the tube as the tube exits from the die. Further, multilayer preforms can be prepared by coextrusion of multiple layers as disclosed, for example, in U.S. Pat. No. 4,233,367, the disclosure of which is totally incorporated herein by reference. The coextrusion process generally entails extrusion of two or more concentric tubes of different composition, followed by contacting the outer surface of the inside tube to the inner surface of the outside tube while both tubes are still in the melt state, followed by cooling the two-layered tube thus formed. More than two layers can be coextruded according to this process. Any other suitable method for preparing a preform can also be employed. The preform need not be completely straight or cylindrical in configuration, since the desired shape of the final belt is determined during the stretch blow molding step of the process of the present invention. Some preforms or parisons are also commercially available from several sources, such as Eastman Chemicals, Kingsport, Tenn. and Owens-Illinois Inc. in the United States and Twinpack, Inc. in Canada.

Figure 1B:
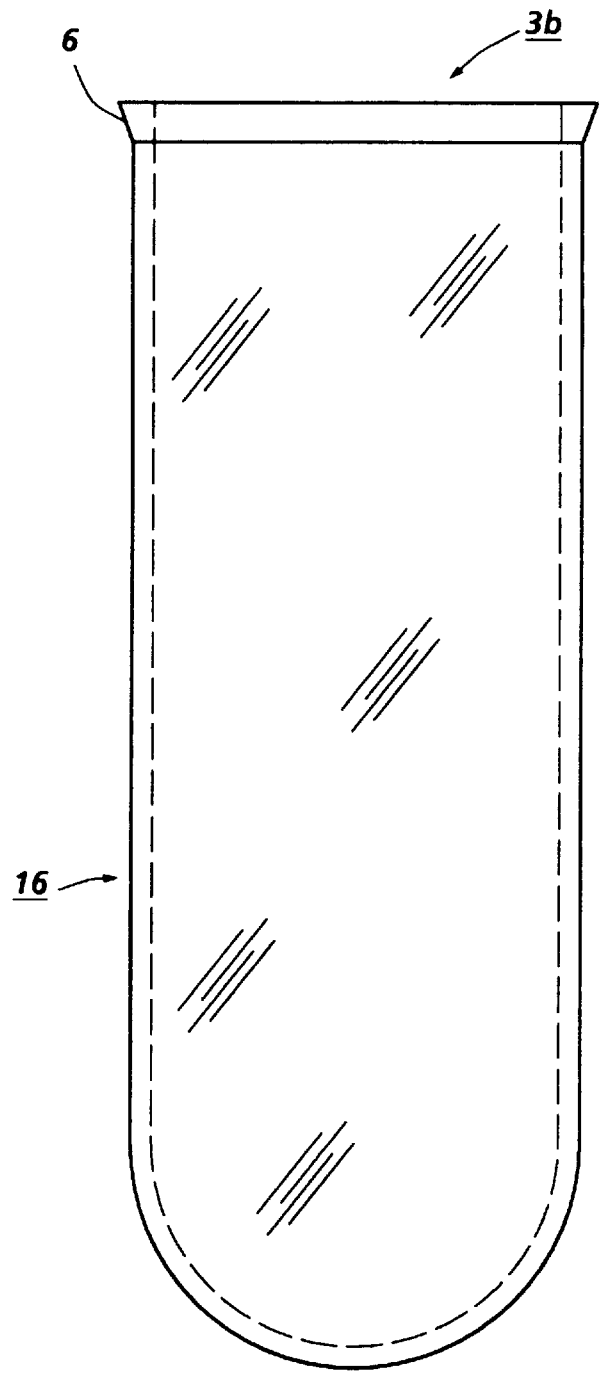
Figure 1C:
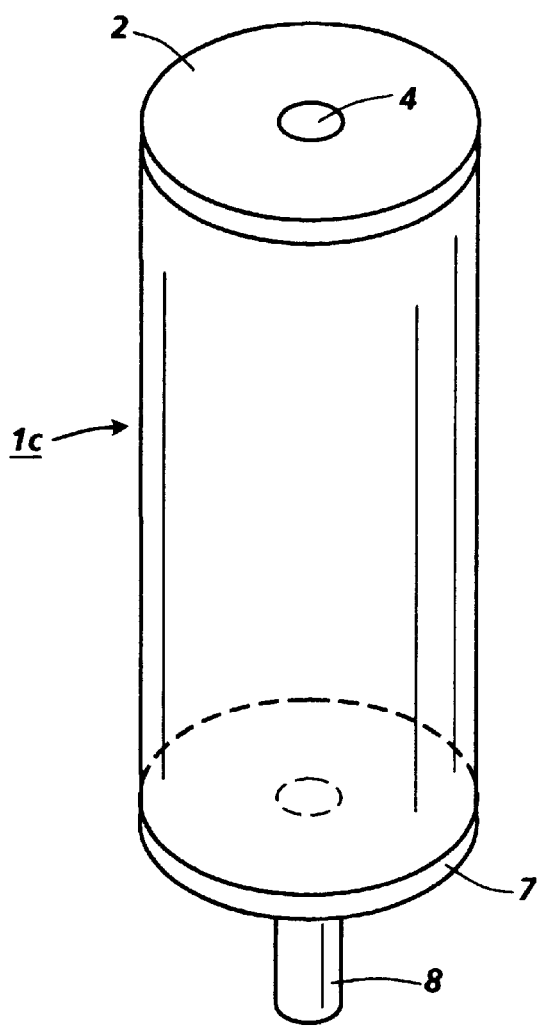

Subsequently, the preform is sealed to enable introduction of a fluid under pressure into the preform, thereby enabling expansion of the preform when it is heated. When the preform is prepared by injection molding processes, it can be designed so that it has a single opening into which fluid can be introduced. One example of a suitable preform configuration that can be prepared by injection molding is illustrated schematically in FIG. 1A, which illustrates a preform 1$a$ with an opening 3$a$ into which a fluid can be introduced. The preform illustrated in FIG. 1A is equipped with an opening 5. Another example of a suitable preform configuration that can be prepared by injection molding is illustrated schematically in FIG. 1B, which illustrates a preform 1$b$ with an opening 3$b$ into which a fluid can be introduced. The preform illustrated in FIG. 1B is equipped with a widened edge or lip 6 for fitting the preform to a preform holder. When the preform is prepared by extrusion or coextrusion processes or other processes that result in a cylindrical product, the cylindrical preform is sealed at each end, with one end seal having an opening to allow introduction of a fluid under pressure into the preform. Sealing of the cylinder ends can be by any suitable means, such as end caps attached to the cylinder by any suitable means, such as threading, gluing, welding, or the like. Preferably, but not necessarily, the end of the preform opposite to that in which the fluid is to be introduced is equipped with a centering means, such as a guide rod, to facilitate centering of the preform in the mold during the blow molding step. An example of a suitable preform configuration that can be prepared by extrusion processes is illustrated in FIG. 1C. As shown in FIG. 1C, preform 1$c$ is sealed at one end with end cap 2 having an opening 4 into which fluid can be introduced, and is sealed at other end with end cap 7 having attached thereto a guide rod 8 for centering the preform within the mold.

Figure 1D:
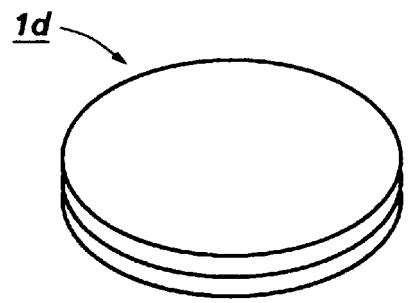
Figure 4:
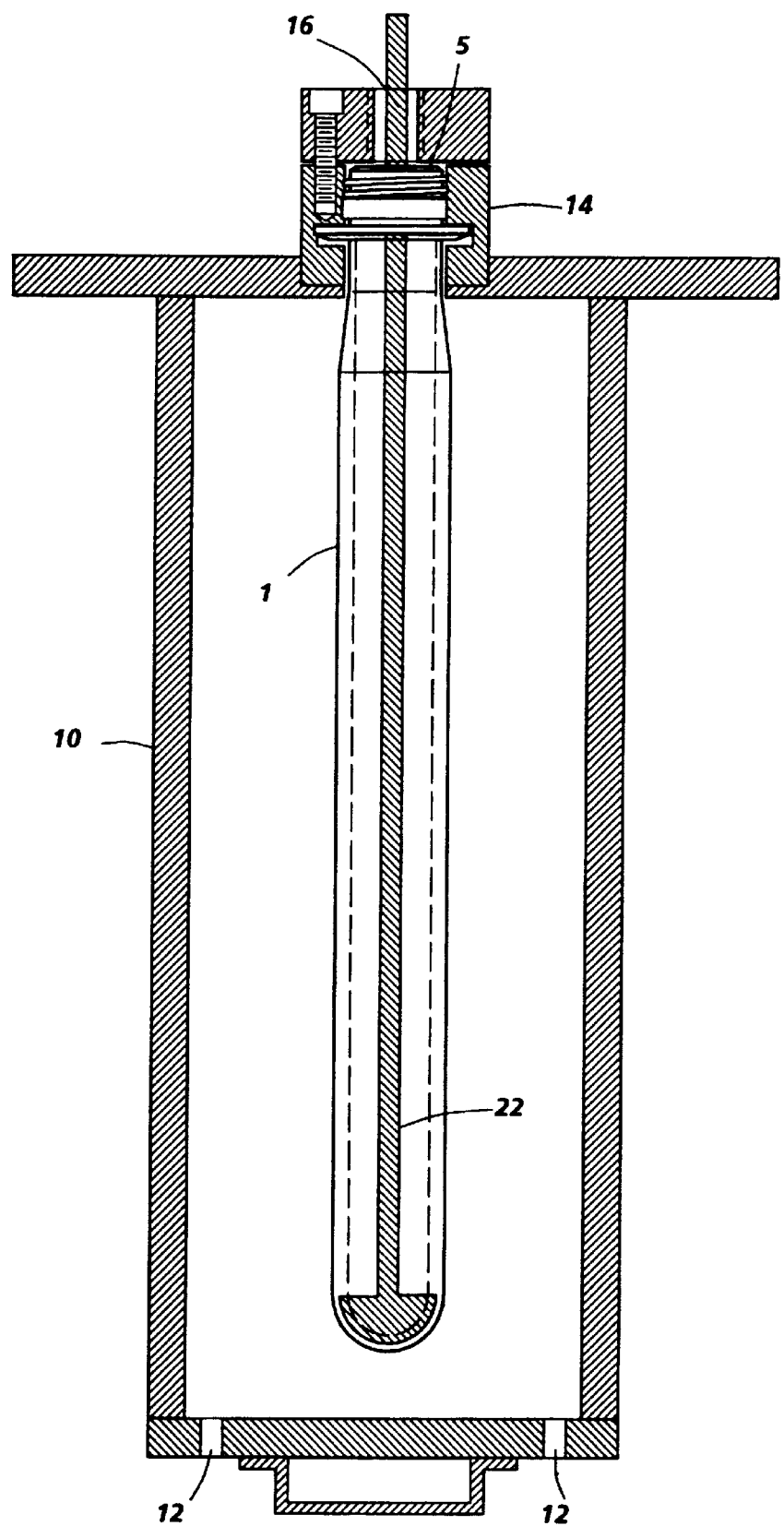
FIG. 4 illustrates an alternative embodiment of the present invention wherein the preform is first stretched mechanically in the axial direction and then stretched in the radial direction by introduction of a fluid into the preform.

Yet another example of a suitable preform configuration is illustrated schematically in FIG. 1D. As shown in FIG. 1D, the preform 1$d$ is a flat plate or disk. As shown in this Figure, preform 1$d$ is a multilayered approximately circular disk structure. The preform illustrated in FIG. 1D can comprise two or more layers, if desired, such as a layer of electrically conductive material and a layer of insulating dielectric material to result in a two-layered article suitable, for example, for use as an ionographic imaging member. Alternatively, preform 1$d$ can consist of a single layer of a polymeric material. The preform configuration illustrated in FIG. 1D is suitable for use in the embodiment of the present invention as illustrated in FIG. 4, wherein the preform is first stretched mechanically in the axial direction of the mold and is then stretched in the radial direction by the introduction of a fluid into the preform. The preform illustrated in FIG. 1D need not be of a diameter as large as that of the inside of the mold; upon stretching mechanically in the axial direction, followed by stretching in the radial direction by introduction of fluid, a preform of diameter smaller than the inner diameter of the mold may enable production of an article with enhanced radial stretch. Further, if desired, the disk preform illustrated in FIG. 1D need not be a perfectly uniform, flat, circular disk. For example, the disk may be equipped with a center reference depression to enable correct placement of the mechanical plunger on the disk for mechanical stretching. In addition, the disk need not be perfectly flat if a non-uniform configuration improves the uniformity of the stretched product. Further, the flat preform need not be circular, but can be square or of any other shape desired. Other configurations, such as a shallow saucer configuration, are also suitable.

The preform is then heated to an appropriate stretching temperature. This temperature is equal to or greater than the glass transition point and below the melting point of the polymer from which the preform is made. The actual temperature employed will depend on the polymer selected for the preform. For example, a polyethylene terephthalate preform generally is heated to a stretching temperature of from about 90 to about 115° C. (which is slightly above the glass transition temperature of 70 to 85° C. and far below the melting temperature of 245 to 265° C.) and a polypropylene preform generally is heated to a stretching temperature of from about 160 to about 165° C. (which is slightly below the melting temperature of 168° C. and far above the glass transition temperature of −20° C.). For uniform heating of the preform, it may be advantageous to rotate the preform during heating. Heating can be accomplished by any suitable means, such as by placing the preform in a forced air convection oven at the appropriate temperature, heating the preform by infrared radiation, heating the preform inside of the blowing mold by forced air convection or infrared radiation, or the like. Generally, the preform is heated as quickly as possible for economic reasons and also to minimize preform crystallization prior to the stretch blow molding stage. For example, preforms with wall thicknesses of about 0.060 inch can be heated in about 7 or 8 minutes with forced convective heating; preforms with wall thicknesses of about 0.125 inch can be heated in about 95 to 105 seconds with infrared heating.

Figure 2A:
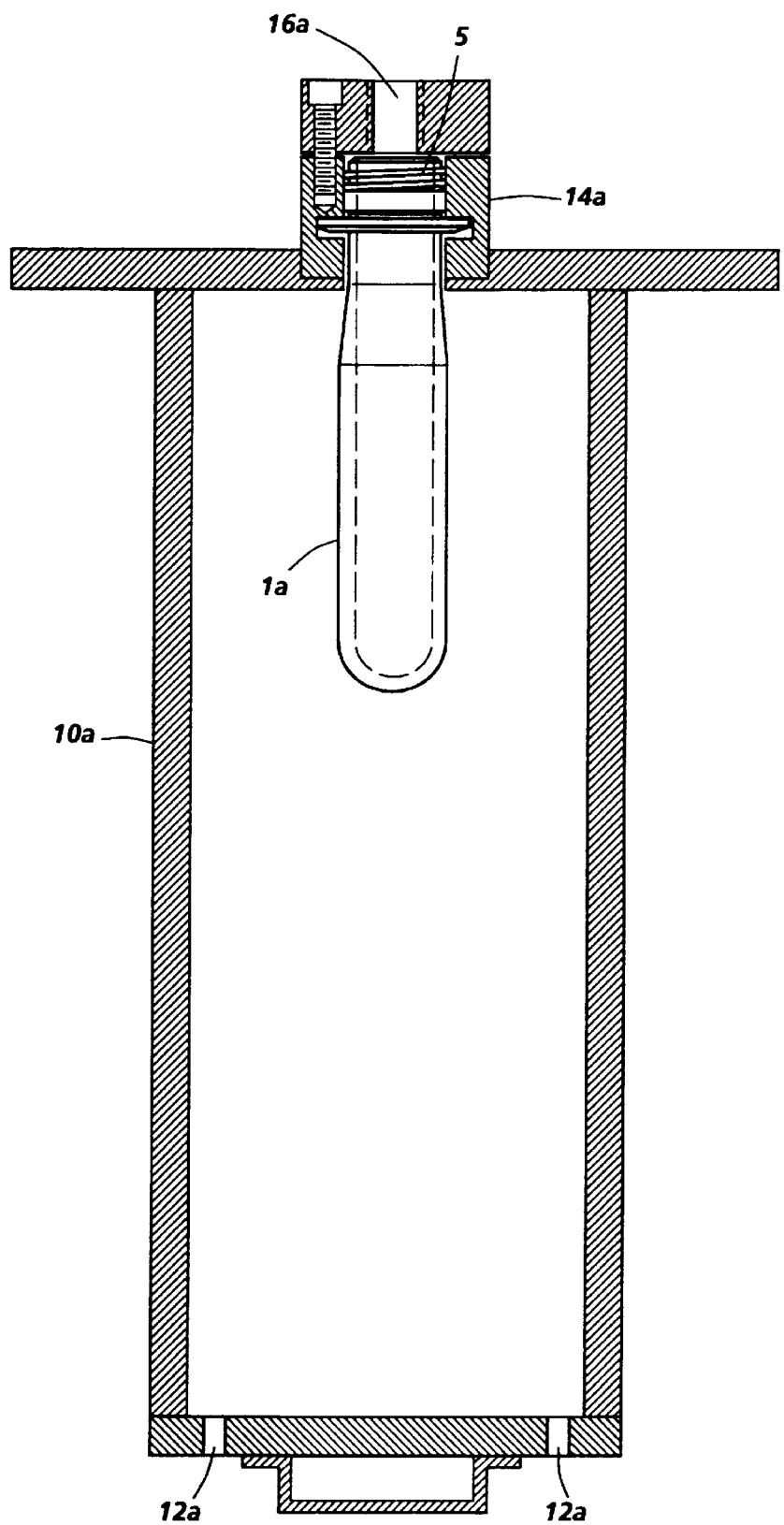
FIGS. 2A and 2B illustrate schematically two mold configurations suitable for the process of the present invention.
Figure 2B:
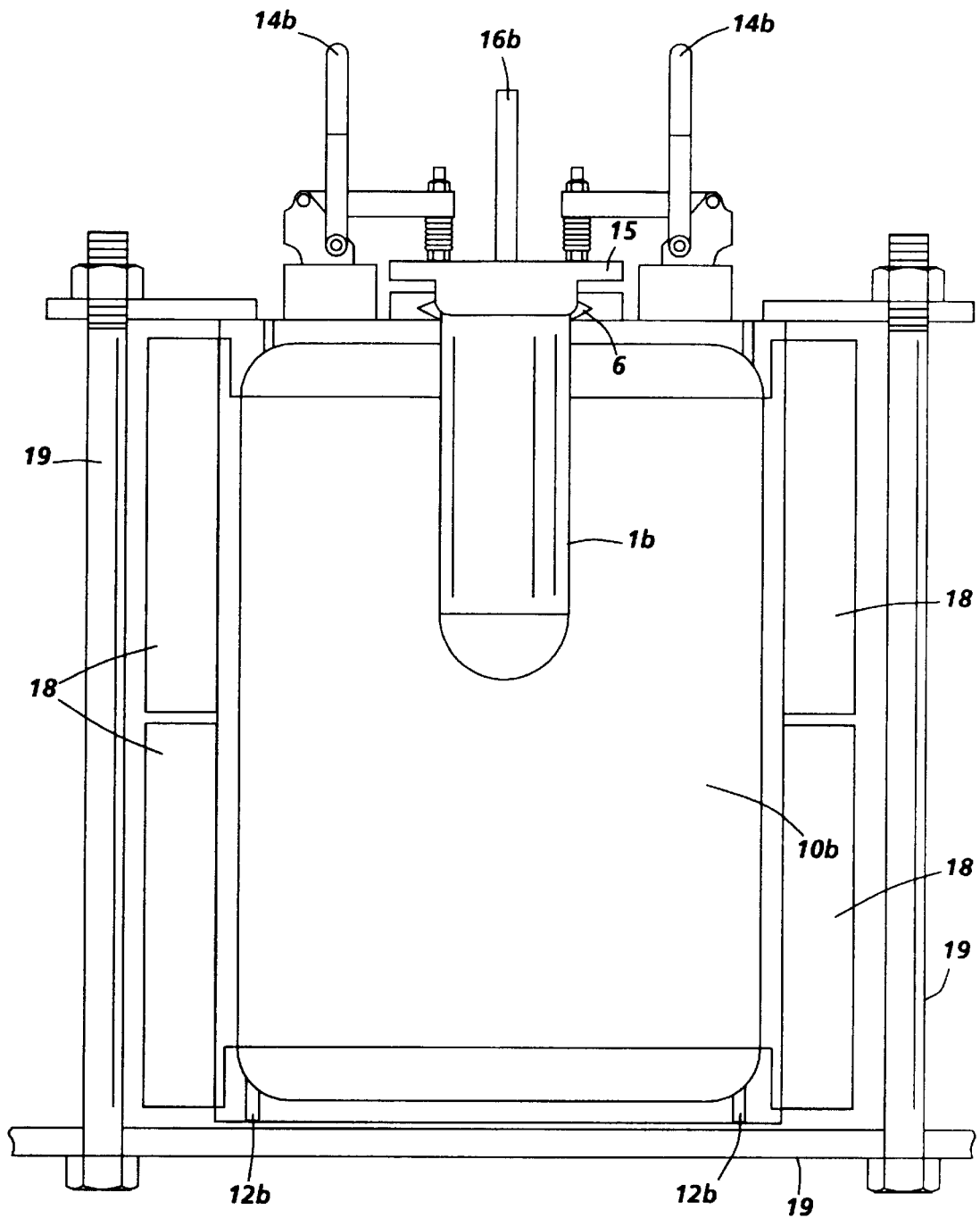

Subsequently, as illustrated schematically in FIGS. 2A and 2B, the heated preform 1 is placed into a blowing mold 10 having air vents 12. The blowing mold 10 generally is substantially cylindrical in shape, and has an inside surface preferably polished to about 4 microinches $R_a$ or less when the belt to be formed is intended for use as a photoreceptor substrate. Surface quality ($R_a$) refers to the height of surface defects or roughness irregularities. The $R_a$ is defined as the average value of the departures from the center line throughout a prescribed sampling length, and is determined by running a stylus along the surface, plotting the surface roughness, and measuring the peaks and valleys of the plot with respect to a center line drawn through the peaks and valleys. When the belt formed by the process is intended for use as a document handler belt, the mold surface can be as smooth or rough as desired, and it may even be desired to roughen the mold surface by processes such as sandblasting or the like to produce a belt with a matte surface. The mold preferably is free of seams and substantially free of other surface irregularities on its inside cylindrical surface to produce a belt without surface nonuniformities. Preferably, the mold is preheated to a temperature at or above the stretching temperature to reduce post stretching mold heat up time. The preform 1 is axially centered within the blowing mold 10. A fluid is introduced under pressure into the heated preform 1 through an opening (not shown in FIGS. 2A and 2B). Any suitable fluid pressure can be used; typical pressures are from about 10 to about 300 pounds per square inch. When air is used, it may be preferable to heat the air, for example to about 100° C. Any suitable fluid can be used. For economic reasons, simple room air is generally preferred, although other gases, such as nitrogen, carbon dioxide, or the like, and liquids, such as water, can also be employed. FIGS. 2A and 2B illustrate schematically two different suitable apparatus configurations for the stretch blow molding process of the present invention. As shown in FIG. 2A, preform 1a is equipped with an opening 5 (as illustrated in FIG. 1A) and is held in place within mold 10a with preform holder 14a. Air is introduced through air inlet 16a in preform holder 14a. Mold 10a is equipped with vent holes 12a to allow expansion of the preform. As shown in FIG. 2B, preform 1b is equipped with a slightly widened edge or lip 6 (as illustrated in FIG. 1B) and is held in place within mold 10b with toggle clamps 14b, which clamp preform 1b tightly to the top surface of mold 10b and retain cap 15 in place over the preform. Air is introduced through air inlet 16b through an opening in cap 15. Mold 10b is equipped with vent holes 12b to allow expansion of the preform. FIG. 2B also shows heating coils 18, which heat mold 10b, and retaining walls 19, which retain heat in the vicinity of mold 10b.

The mold wall is generally preheated to a temperature at or above the stretching temperature. Mold wall temperature can be controlled by any suitable means, such as by circulating a heat transfer fluid in a jacket surrounding the mold wall, passing a heated air stream past the mold walls, the use of electrical resistance heaters or induction heating coils, or the like. As the pressure in the preform rises, it expands, generally beginning with a uniform expansion until an aneurysm forms. The region of the aneurysm then expands rapidly to the natural draw diameter, where it is stable. (See C. Bonnebat et al., *Polym. Eng. Sci.*, vol. 21, no. 4, p. 189, 190 (Results and Discussion) (1981) for a discussion of natural draw diameter for PET; this discussion is also applicable to other polymers at different temperatures.) For temperatures above a given point (for example, with PET, the temperature is 85° C.), the tensile stress is essentially constant as a function of draw ratio up to a critical draw ratio λ, called the Natural Draw Ratio. Above λ the stretching force increases very rapidly with draw ratio, referred to as strain hardening. This is the principle under which stretch blow molding occurs. For a cylindrical parison or preform, inflation starts in the central zone and propagates to both edges of the preform until the preform is "fully blown". At this point, the Natural Axial Draw Ratio $\lambda_L$ is defined as the length ratio of expanded preform to the original preform, and the Natural Radial Draw Ratio $\lambda_R$ is defined as the diameter ratio of expanded preform to the original preform. $\lambda_L$ and $\lambda_R$ have different values, and are functions of temperature and polymer molecular weight. Thus, values of $\lambda_L$ and $\lambda_R$ can be determined experimentally (as in the above reference). A theoretical expression has been derived in "Blowing of Oriented PET Bottles: Predictions of Free Blown Size and Shape", L. Erwin et al., *Polym. Eng. Sci.*, vol. 23, no. 15, p. 826 (1983), the disclosure of which is totally incorporated herein by reference. If inflation is continued beyond this stage by increasing the pressure, deformation occurs in the entire expanded parison or preform. Thus, it is important in that the mold diameter be greater than the natural draw diameter of the preform so that that the stretch occurs unimpeded. The expanded region of the aneurysm then propagates throughout the length of the preform. During this time, the preform is centered axially within the mold, which is of a diameter greater than the natural draw diameter, and the expanded preform is prevented from contacting the mold during propagation of the expanded region. When a centering means such as a guide rod is attached to the end of the preform opposite to that from which the fluid is introduced, the centering means is retracted as the preform expansion propagates to maintain the preform centered in the mold and to prevent the expanding preform from contacting the mold walls.

Figure 3A:
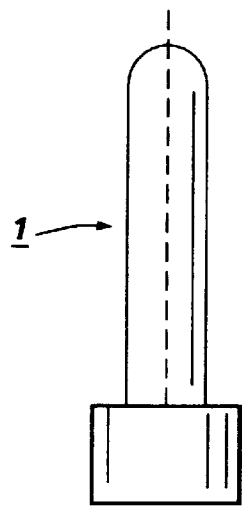
FIGS. 3A, 3B, 3C, and 3D illustrate schematically the various stages following introduction of fluid into a heated preform as the preform is situated in a seamless cylindrical mold to cause expansion to the preform's natural draw diameter according to the process of the present invention.
Figure 3B:
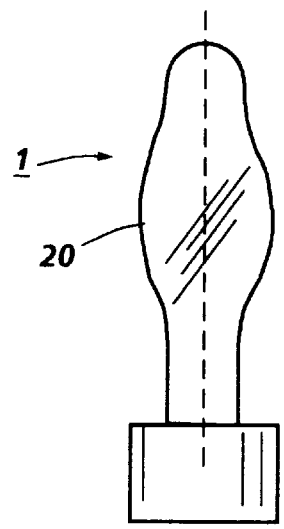
Figure 3C:
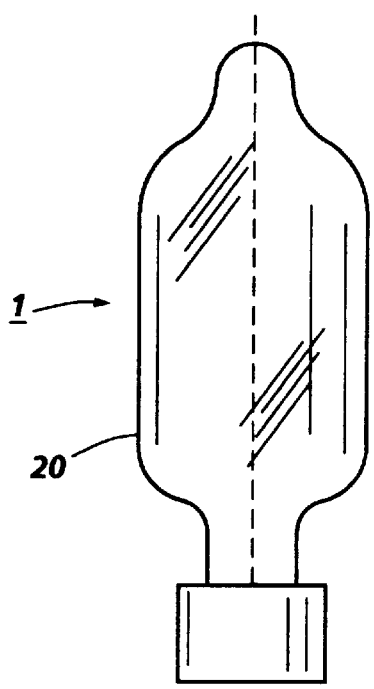
Figure 3D:
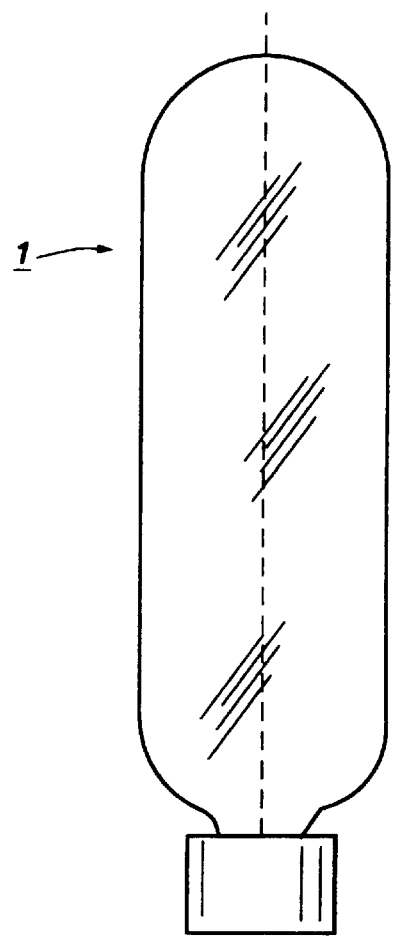

FIGS. 3A through 3D illustrate schematically the various stages of the preform during stretch blow molding. In FIG. 3A, the preform 1 has not yet begun to stretch. In FIG. 3B, preform 1 has formed an aneurysm 20 at approximately the center of the cylindrical preform. In FIG. 3C, aneurysm 20 has propagated to nearly the entire length of preform 1. FIG. 3D illustrates preform 1 expanded to its natural draw diameter.

During the expansion step, the previously amorphous preform is biaxially stretched, resulting in strain crystallization and increased tensile strength. For example, with a polyethylene terephthalate preform, the crystallinity of the preform prior to stretch blow molding is typically less than about 2 percent, and subsequent to stretch blow molding is typically about 25 percent. The biaxial orientation of the polymer molecules results in significantly increased tensile strength of the belt.

Alternatively, instead of stretching the preform both axially and radially by pressure from the fluid, the preform can be first stretched mechanically in the axial direction by any appropriate means, such as a stretching pin or the like, followed by stretching the preform radially by fluid pressure. Subsequently, the resulting film can be removed from the mold and cut to produce a belt of the desired width. As illustrated schematically in FIG. 4, preform 1 has opening 5 and is situated in mold 10 and held in place with preform holder 14. Stretching means 22 extends through the opening in the preform 1 along the central axis of preform 1 and mold 10. As shown in FIG. 4, stretching means 22 has stretched preform 1 in the axial direction but no fluid has as yet been introduced under pressure through air inlet 16 to stretch preform 1 in the radial direction.

Instead of a bottle-type preform, a flat or approximately flat preform as illustrated in FIG. 1D can also be used in this embodiment of the present invention. In addition, stretching means 22 can, if desired, be equipped with a heating means, such as a source of infrared radiation, which can heat the preform prior to stretching and can also heat the stretched preform inside the mold. For this embodiment of the invention, a flat or approximately flat preform may have advantages such as simplicity and low cost for manufacturing the preform, very high surface quality of the preform, the ability to form multilayered preforms easily, and the like.

Subsequently, while the expanded preform is still in the mold and fluid pressure is still present, the expanded preform is rapidly heated to an appropriate heat setting temperature. This heating step subsequent to the stretch blow molding step further increases the crystallinity level of the preform polymer and improves the dimensional stability of the stretch blow molded tube. When this subsequent heating step is not performed, the resulting molded item exhibits greatly reduced dimensional stability compared to a molded item that is subsequently heated. For example, a polyethylene terephthalate tube prepared from an injection molded preform, blow molded at a temperature of from about 90 to about 115° C., and subsequently removed from the mold with no subsequent heat setting step is likely to collapse and shrivel when later heated to a temperature of above 115° C. In contrast, a polyethylene terephthalate tube prepared from an injection molded preform, stretch blow molded at a temperature of from about 90 to about 115° C., subjected to heat setting at a temperature of about 200° C., and subsequently removed from the mold, exhibits dimensional stability when later heated to a temperature of about 190° C. The heat setting temperature is above the stretching temperature and below the melting temperature of the polymer from which the preform is made. Generally, the heat temperature is selected to be substantially (i.e., at least about 10° C.) above any temperature at which the belt made from the process will be used. For example, for a polyethylene terephthalate preform typical heat setting temperatures are from about 150 to about 230° C.

Heating to the setting temperature is performed as rapidly as possible to ensure that the resulting belt exhibits little or no hazing or clouding and maximum heat stability. Rapid heating can be accomplished by any suitable method, such as by heating the mold with electrical resistance heater bands, induction heating, immersing the mold in a bath of hot fluid, or the like. Generally, heating is performed over a period of 15 minutes or less to obtain belts with the most desirable mechanical and optical properties although longer heating periods can be used if desired. For polyethylene terephthalate, heat setting times of less than 1 minute are preferred.

After the expanded preform has been subjected to heat setting, it is rapidly cooled and removed from the mold. Cooling is performed as rapidly as possible to ensure that the resulting belt exhibits little or no hazing and maximum heat stability and to minimize the process time. Rapid cooling can be accomplished by any suitable method, such as by immersing the mold in a bath of cold fluid, passing cold fluid through cooling coils in a cooling band surrounding the mold, forcing cold air past the mold, or the like. Generally, cooling is performed over a period of 15 minutes or less to obtain belts with the most desirable mechanical and optical properties. If desired, removal from the mold can be facilitated by any suitable means, such as by blowing air between the expanded preform and the mold wall, by coating the mold wall with a release agent prior to the molding step, or the like. If desired, the expanded preform is then cut to one or more seamless belts of the desired size by any suitable means, such as laser cutting, knife slitting, water jet cutting, or the like.

The process of the present invention enables formation of seamless belts with excellent tensile strength, excellent thickness tolerances, and excellent surface uniformity. For example, seamless belts prepared according to the process of the present invention from polyethylene terephthalate and polypropylene exhibit tensile strengths of from 30,000 to over 40,000 pounds per square inch, thereby enabling the use of thinner belts for a given purpose. In addition, by virtue of the thinning process inherent in the process of the present invention, improved thickness tolerances can be obtained. For example, a preform can be prepared with a thickness of 50 mils and a thickness tolerance of ±0.25 mil. By stretching this preform by a factor of 10 during the process of the present invention, a seamless belt can be obtained with a thickness of 5 mils and a thickness tolerance of ±0.025 mil. Similarly, a preform with a thickness of 5 mils and a thickness tolerance of ±0.25 mil can be stretched by a factor of 10 during the process of the present invention to obtain a seamless belt with a thickness of 0.5 mils and a thickness tolerance of ±0.025 mil. Further, multi-layer seamless belts can be prepared by coextruding layers of the desired materials and of the desired relative thicknesses by known processes to make a preform, followed by stretching the preform according to the process of the present invention to obtain a multi-layer seamless belt with excellent thickness tolerances for all layers, including the thinnest layers. Additionally, the surface finish of seamless belts prepared according to the process of the present invention, including belts containing fillers such as carbon black, is uniform and exhibits no waviness and puckering.

In addition, seamless belts prepared according to the process of the present invention generally exhibit little or no hazing.

Seamless belts prepared by the process of the present invention are suitable for use as substrates in electrophotographic imaging members. If the belt polymer contains a conductive filler, the belt can function as a conductive substrate. Additional layers may be added to the belts to prepare such members. When the seamless belt prepared by the process of the present invention is not conductive, a conductive layer is first applied to the belt by any suitable method, such as spray coating, dip coating, sputter coating, painting, metallizing, or the like. The additional layers, generally applied to the conductive surface of the belt, may comprise a blocking layer, an adhesive layer, a photoconductive layer, a charge transport layer, or a combination of these layers with or without additional layers. One embodiment of the present invention is directed to a process for preparing an electrophotographic imaging member which comprises preparing a seamless belt by the process of the present invention as detailed herein and coating onto the seamless belt a layer of a photogenerating material. The imaging member can then be employed in an imaging process. Another embodiment of the present invention is directed to an imaging process which comprises (1) preparing an imaging member by (a) preparing a seamless belt by the process of the present invention as described herein; and (b) coating onto the seamless belt a layer of a photogenerating material; (2) forming an electrostatic latent image on the imaging member; (3) developing the latent image; and (4) transferring the developed image to a substrate. Optionally, the transferred image can be permanently affixed to the substrate by any suitable means. Imaging members formed and employed according to the process of the present invention can be photoconductive or photosensitive in nature, wherein the latent image is formed by exposure to a light image, ionographic in nature, wherein the imaging member has a dielectric surface and the image is applied with an ionographic writing head, or by any other suitable imaging process.

Any suitable conductive material can be employed as a conductive layer for imaging members prepared according to the present invention, including copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. When the imaging member is to be employed for ionographic imaging processes, it can consist of a conductive layer and a dielectric layer. When the polymeric seamless belt is prepared according to the process of the present invention, the conductive layer can be applied by any method suitable for the conductive material, such as vacuum deposition, electrolytic deposition, solvent coating, sputter coating, or the like. Alternatively, a multilayer structure comprising a conductive layer and a dielectric layer can be prepared by formulating the preform with two distinct layers, one conductive and one dielectric, and expanding the preform according to the process of the present invention. The conductive layer is of an effective thickness, generally from about 5 to about 250 microns, although the thickness can be outside of this range.

In a dielectric receiver for use in ionographic imaging processes, the receiver generally comprises a conductive layer as described for electrophotographic imaging members and a dielectric or insulative layer. The dielectric layer is of any effective thickness, typically from about 0.0005 inch to about 0.01 inch, although the thickness can be outside of this range.

Any suitable blocking layer or layers may optionally be applied as one of the imaging member coatings of this invention. Typical blocking layers include gelatin (e.g. Gelatin 225, available from Knox Gelatine Inc.), and Carboset 515 (B.F. Goodrich Chemical Company) dissolved in water and methanol, polyvinyl alcohol, polyamides, gamma-aminopropyl triethoxysilane, and the like, used alone or in mixtures and blends. Blocking layers generally range in thickness of from about 0.01 micron to about 2 microns, and preferably have a thickness of from about 0.1 micron to about 1 micron. Thicknesses outside these ranges may be selected provided that the objectives of the present invention are achieved. The blocking layer may be applied with any suitable liquid carrier. Typical liquid carriers include water, methanol, isopropyl alcohol, ketones, esters, hydrocarbons, and the like.

Any suitable adhesive layer may be applied as one of the imaging member coatings of this invention. Typical adhesive layers include polyesters such as Du Pont 49,000, available from E.I. du Pont de Nemours & Company, poly(2-vinylpyridine), poly(4-vinylpyridine), and the like. Adhesive layers generally range in thickness of from about 0.05 micron to about 2 microns, and preferably have a thickness of from about 0.1 micron to about 1 micron. Thicknesses outside these ranges may be selected provided that the objectives of the present invention are achieved. The adhesive layer may be applied with a suitable liquid carrier. Typical liquid carriers include methylene chloride, methanol, isopropyl alcohol, ketones, esters, hydrocarbons, and the like.

Any suitable photoconductive layer or layers may be applied as one of the imaging member coatings of this invention. The photoconductive layer or layers may contain inorganic or organic photoconductive materials. Typical inorganic photoconductive materials include well known materials such as amorphous selenium, trigonal selenium, selenium alloys, halogen-doped selenium alloys such as selenium-tellurium, selenium-tellurium-arsenic, selenium-arsenic, and the like, cadmium sulfoselenide, cadmium selenide, cadmium sulfide, zinc oxide, titanium dioxide and the like. Inorganic photoconductive materials are normally dispersed in a film forming polymer binder. Examples of suitable binders include poly(N-vinylcarbazole), polyvinylbutyral, polystyrene, phenoxy resins, polycarbonate, polyethylene terephthalate, poly N-vinylpyrrolidinone, polyvinyl alcohol, and the like. Typical organic photoconductors include phthalocyanines, quinacridones, pyrazolones, polyvinylcarbazole-2,4,7-trinitrofluorenone, anthracene and the like. Many organic photoconductor materials may also be used as particles dispersed in a resin binder. Typically, the photoconductive material is present in an amount of from about 5 to about 80 percent by weight and the binder is present in an amount of from abut 20 to about 95 percent by weight.

Any suitable multilayer photoconductors may also be employed in the imaging member of this invention. The multilayer photoconductors comprise at least two electrically operative layers, a photogenerating or charge generating layer and a charge transport layer. The charge generating layer and charge transport layer as well as the other layers may be applied in any suitable order to produce either positive or negative charging photoreceptors. For example, the charge generating layer may be applied prior to the charge transport layer as illustrated in U.S. Pat. No. 4,265,990 or the charge transport layer may be applied prior to the charge generating layer as illustrated in U.S. Pat. No. 4,346,158, the entire disclosures of these patents being incorporated herein by reference.

The photogenerating layer may comprise single or multiple layers comprising inorganic or organic compositions and the like. One example of a generator layer is described in U.S. Pat. No. 3,121,006, wherein finely divided particles of a photoconductive inorganic compound are dispersed in an electrically insulating organic resin binder. Useful binder materials disclosed therein include those which are incapable of transporting for any significant distance injected charge carriers generated by the photoconductive particles. Thus, the photoconductive particles must be in substantially contiguous particle to particle contact throughout the layer for the purpose of permitting charge dissipation required for cyclic operation. Thus, about 50 percent by volume of photoconductive particles is usually necessary in order to obtain sufficient photoconductive particle to particle contact for rapid discharge.

Examples of photogenerating layers include trigonal selenium, alloys of selenium with elements such as tellurium, arsenic, and the like, amorphous silicon, various phthalocyanine pigments such as the X-form of metal free phthalocyanine described in U.S. Pat. No. 3,357,989, metal phthalocyanines such as copper phthalocyanine, quinacridones available from DuPont under the tradename Monastral Red, Monastral Violet and Monastral Red Y, substituted 2,4-diamino-triazines disclosed in U.S. Pat. No. 3,442,781, polynuclear aromatic quinones, Indofast Violet Lake B, Indofast Brilliant Scarlet and Indofast Orange. Examples of photosensitive members having at least two electrically operative layers include the charge generator layer and diamine containing transport layer members disclosed in U.S. Pat. Nos. 4,265,990, No. 4,233,384, No. 4,306,008 and No. 4,299,897; dyestuff generator layer and oxadiazole, pyrazalone, imidazole, bromopyrene, nitrofluourene and nitronaphthalimide derivative containing charge transport layers members disclosed in U.S. Pat. No. 3,895,944; generator layer and hydrazone containing charge transport layers members disclosed in U.S. Pat. No. 4,150,987; generator layer and a tri-aryl pyrazoline compound containing charge transport layer members disclosed in U.S. Pat. No. 3,837,851; and the like. The disclosures of these patents are incorporated herein in their entirety.

Photogenerating layers containing photoconductive compositions and/or pigments and the resinous binder material generally ranges in thickness of from about 0.1 micron to about 5.0 microns, and preferably have a thickness of from about 0.3 micron to about 1 micron. Thicknesses outside these ranges may be selected provided the objectives of the present invention are achieved. The photogenerating composition or pigment may be present in the film forming polymer binder compositions in various amounts. For example, from about 10 percent by volume to about 60 percent by volume of the photogenerating pigment may be dispersed in about 40 percent by volume to about 90 percent by volume of the film forming polymer binder composition, and preferably from about 20 percent by volume to about 30 percent by volume of the photogenerating pigment may be dispersed in about 70 percent by volume to about 80 percent by volume of the film forming polymer binder composition. The particle size of the photoconductive compositions and/or pigments should be less than the thickness of the deposited solidified layer and, more preferably between about 0.01 micron and about 0.5 micron to facilitate better coating uniformity.

Any suitable transport layer may be applied as one of the imaging member coatings of this invention to form a multilayered photoconductor. The transport layer may contain a film forming polymer binder and a charge transport material. A preferred multilayered photoconductor comprises a charge generation layer comprising a layer of photoconductive material and a contiguous charge transport layer of a polycarbonate resin material having a molecular weight of from about 20,000 to about 120,000 having dispersed therein from about 25 to about 75 percent by weight of one or more compounds having the general formula:

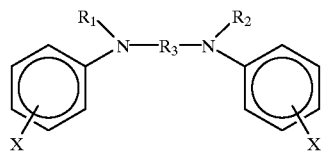

wherein $R_1$ and $R_2$ are an aromatic group selected from the group consisting of a substituted or unsubstituted phenyl group, naphthyl group, and polyphenyl group, $R_3$ is selected from the group consisting of a substituted or unsubstituted biphenyl group, diphenyl ether group, alkyl group having from 1 to 18 carbon atoms, and cycloaliphatic group having from 3 to 12 carbon atoms and X is selected from the group consisting of an alkyl group having from 1 to about 4 carbon atoms and chlorine, the photoconductive layer exhibiting the capability of photogeneration of holes and injection of the holes and the charge transport layer being substantially non-absorbing in the spectral region at which the photoconductive layer generates and injects photogenerated holes but being capable of supporting the injection of photogenerated holes from the photoconductive layer and transporting the holes through the charge transport layer. Examples of charge transporting aromatic amines including those represented by the structural formula above and others for charge transport layers capable of supporting the injection of photogenerated holes of a charge generating layer and transporting the holes through the charge transport layer include N,N'-bis (alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3"-methylphenyl)-(1,1'-biphenyl)-4,4'-diamine, and the like dispersed in an inactive resin binder. Examples of some of these transport materials are described, for example in U.S. Pat. No. 4,265,990 to Stolka et al., the entire disclosure thereof being incorporated herein by reference. Other examples of charge transport layers capable of supporting the injection of photogenerated holes of a charge generating layer and transporting the holes through the charge transport layer include triphenylmethane, bis(4-diethylamine-2-methylphenyl) phenylmethane; 4',4"-bis(diethylamino)-2',2"-dimethyltriphenyl methane and the like dispersed in an inactive resin binder. Numerous inactive resin materials may be employed in the charge transport layer including those described, for example, in U.S. Pat. No. 3,121,006, the entire disclosure of which is incorporated herein by reference. The resinous binder for the charge transport layer may be identical to the resinous binder material employed in the charge generating layer. Typical organic resinous binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinyl chloride, vinyl chloride and vinyl acetate copolymers, acrylate copolymers, alkyd resins, cellulosic film formers, polyamide-imide, styrene-butadiene copolymers, vinylidene chloride-vinyl chloride copolymers, vinyl acetate-vinylidene chloride copolymers, styrene-alkyd resins, and the like. These polymers may be block, random, or alternating copolymers.

Generally, the thickness of the solidified transport layer is between about 5 to about 100 microns, but thicknesses outside this range can also be used. The charge transport layer should be an insulator to the extent that the electrostatic charge placed on the charge transport layer is not conducted in the absence of illumination at a rate sufficient to prevent formation and retention of an electrostatic latent image thereon. In general, the ratio of the thickness of the solidified charge transport layer to the charge generator layer is preferably maintained from about 2:1 to 200:1 and in some instances as great as 400:1.

The charge blocking layer generally has a thickness of from about 0.05 to about 5 microns The charge blocking layer prevents charge injection from the conductive layer into the photogeneration layer and also transfers the discharged electrons into the conductive layer.

Generally, the adhesive layer is situated between the generator layer and the blocking layer, and has a thickness of from about 0.01 to about 2 microns. The adhesive layer may be selected from several known adhesives, such as PE-100, PE200, and 49000 available from Du Pont Chemical Company, or 4-polyvinylpyridine.

If desired, the photoreceptor may also include an overcoating. Any suitable overcoating may be utilized in the fabrication of the photoreceptor of this invention. Typical overcoatings include silicone overcoatings described, for example, in U.S. Pat. No. 4,565,760, polyamide overcoatings such as Elvamide, available from E.I. du Pont de Nemours & Company, tin oxide particles dispersed in a binder described, for example, in U.S. Pat. No. 4,426,435, metallocene compounds in a binder described, for example, in U.S. Pat. No. 4,315,980, antimony-tin particles in a binder, charge transport molecules in a continuous binder phase with charge injection particles described in U.S. Pat. No. 4,515,882, polyurethane overcoatings, and the like. The disclosures of U.S. Pat. No. 4,565,760, U.S. Pat. No. 4,426,435, U.S. Pat. No. 4,315,980, and U.S. Pat. No. 4,515,882 are totally incorporated herein by reference. The choice of overcoating materials would depend upon the specific photoreceptor prepared and the protective quality and electrical performance desired. Generally, any overcoatings applied have a thickness between about 0.5 micron and about 10 microns.

Any of the coating materials comprising film forming polymers may be deposited on the imaging member from solutions, dispersions, emulsions or powders by any suitable technique. However, the deposited coating should form a thin substantially uniform fluid coating on the mandrel prior to solidification of the coating. Typical techniques for depositing coatings include spray coating, dip coating, wire wound rod coating, powder coating, electrostatic spraying, sonic spraying, blade coating, and the like. If the coating is applied by spraying, spraying may be effected with or without the aid of a gas. Spraying may be assisted by mechanical and/or electrical aids such as in electrostatic spraying. Materials and process parameters are interdependent in a spray coating operation. Some of the process parameters include propellant gas pressure, solution flow rate, secondary gas nozzle pressure, gun to substrate distance, gun traversal speed and mandrel rotation rate. Materials parameters include, for example, solvent mixtures which affect drying characteristics, the concentration of dissolved solids, the composition of the dissolved solids (e.g. monomer, polymer), and the concentration of dispersed solids when dispersions or solutions are utilized. The deposited coating should be uniform, smooth, and free from blemishes such as entrained gas bubbles and the like.

Electrophotographic imaging members prepared according to the present invention comprise a conductive substrate layer, which may be a polymeric belt containing a conductive filler material prepared by a blow molding process as disclosed herein or a substrate consisting of a belt prepared by the process of the present invention which has been coated with a conductive material, and a photogenerating or photoconductive layer. Any one or more of the other layers described herein can also be present in the imaging member. In addition, belts prepared according to the process of the present invention can be employed as ionographic electroreceptors. Ionographic processes are described, for example, in U.S. Pat. Nos. 3,564,556, No. 3,611,419, No. 4,619,515, No. 4,240,084, No. 4,569,584, No. 4,463,363, No. 2,919, 171, No. 4,524,371, No. 4,254,424, No. 4,538,163, No. 4,409,604, No. 4,408,214, No. 4,365,549, No. 4,267,556, No. 4,160,257, No. 4,155,093, the disclosures of each of which are totally incorporated herein by reference. An ionographic electroreceptor generally comprises at least a conductive layer and a dielectric layer. Ionographic electroreceptors can be prepared according to the present invention by preparing an insulating dielectric layer by a blow molding process as set forth herein, followed by coating a conductive layer onto the dielectric layer to form the electroreceptor. Alternatively, the conductive layer can be prepared by a blow molding process as set forth herein, followed by coating an insulating dielectric layer onto the conductive layer to form the electroreceptor. Additionally, an electroreceptor can be prepared according to the present invention by first preparing a two layer preform with a conductive layer and a dielectric layer by any suitable process, such as coextrusion, coinjection molding, or the like, followed by subjecting the two layer preform to the blow molding process as described herein to result in an electroreceptor with a conductive layer and an insulating dielectric layer.

The electroreceptor thus prepared can be employed in an onographic imaging process. Another embodiment of the present invention is directed to an imaging process which comprises (1) preparing an imaging member having a conductive layer and an insulating layer by the process of the present invention; (2) forming an electrostatic latent image on the imaging member by ion deposition; (3) developing the latent image; and (4) transferring the developed image to a substrate. Optionally, the transferred image can be permanently affixed to the substrate by any suitable means.

Any suitable dry or liquid developer containing electrostatically attractable marking particles can be employed to develop the latent image in the electrophotographic and Monographic imaging processes of the present invention. Typical dry toners have a particle size of between about 6 microns and about 20 microns. Typical liquid toners have a particle size of between about 0.1 micron and about 3 microns. The size of toner particles generally affects the resolution of prints. For applications demanding very high resolution, liquid toners are generally preferred because their much smaller toner particle size gives better resolution of fine half-tone dots and produce four color images without undue thickness in dense black areas. Conventional development techniques can be utilized to deposit the toner particles on the imaging surface of the imaging member.

Two-component developers generally comprise toner particles and carrier particles. Typical toner particles can be of any composition suitable for development of electrostatic latent images, such as those comprising a resin and a colorant. Typical toner resins include polyesters, polyamides, epoxies, polyurethanes, diolefins, vinyl resins and polymeric esterification products of a dicarboxylic acid and a diol comprising a diphenol. Examples of vinyl monomers include styrene, p-chlorostyrene, vinyl naphthalene, unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters such as esters of monocarboxylic acids, including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate, and the like; acrylonitrile, methacrylonitrile, acrylamide, vinyl ethers, including vinyl methyl ether, vinyl isobutyl ether, and vinyl ethyl ether; vinyl ketones such as vinyl methyl ketone, vinyl hexyl ketone, and methyl isopropenyl ketone; N-vinyl indole and N-vinyl pyrrolidene; styrene butadienes; mixtures of these monomers; and the like. The resins are generally present in an amount of from about 30 to about 99 percent by weight of the toner composition, although they can be present in greater or lesser amounts.

Any suitable pigments or dyes or mixture thereof can be employed in the toner particles. Typical pigments or dyes include carbon black, nigrosine dye, aniline blue, magnetites, and mixtures thereof, with carbon black being a preferred colorant. The pigment is preferably present in an amount sufficient to render the toner composition highly colored to permit the formation of a clearly visible image on a recording member. Generally, the pigment particles are present in amounts of from about 1 percent by weight to about 20 percent by weight based on the total weight of the toner composition; however, lesser or greater amounts of pigment particles can be present.

Other colored toner pigments include red, green, blue, brown, magenta, cyan, and yellow particles, as well as mixtures thereof. Illustrative examples of suitable magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy aceto-acetanilide, Permanent Yellow FGL, and the like. These color pigments are generally present in an amount of from about 15 weight percent to about 20.5 weight percent based on the weight of the toner resin particles, although lesser or greater amounts can be present.

When the pigment particles are magnetites, which comprise a mixture of iron oxides ($Fe_3O_4$) such as those commercially available as Mapico Black, these pigments are present in the toner composition in an amount of from about 10 percent by weight to about 70 percent by weight, and preferably in an amount of from about 20 percent by weight to about 50 percent by weight, although they can be present in greater or lesser amounts.

The toner compositions can be prepared by any suitable method. For example, the components of the dry toner particles can be mixed in a ball mill, to which steel beads for agitation are added in an amount of approximately five times the weight of the toner. The ball mill can be operated at about 120 feet per minute for about 30 minutes, after which time the steel beads are removed. Dry toner particles for two-component developers generally have an average particle size between about 6 micrometers and about 20 micrometers.

Any suitable external additives can also be utilized with the dry toner particles. The amounts of external additives are measured in terms of percentage by weight of the toner composition, but are not themselves included when calculating the percentage composition of the toner. For example, a toner composition containing a resin, a pigment, and an external additive can comprise 80 percent by weight resin and 20 percent by weight pigment; the amount of external additive present is reported in terms of its percent by weight of the combined resin and pigment. External additives can include any additives suitable for use in electrostatographic toners, including straight silica, colloidal silica (e.g. Aerosil R972®, available from Degussa, Inc.), ferric oxide, unilin, polypropylene waxes, polymethylmethacrylate, zinc stearate, chromium oxide, aluminum oxide, stearic acid, polyvinylidene fluoride (e.g. Kynar$^3$, available from Pennwalt Chemicals Corporation), and the like. External additives can be present in any suitable amount, provided that the objectives of the present invention are achieved.

Any suitable carrier particles can be employed with the toner particles. Typical carrier particles include granular zircon, steel, nickel, iron ferrites, and the like. Other typical carrier particles include nickel berry carriers as disclosed in U.S. Pat. No. 3,847,604, the entire disclosure of which is incorporated herein by reference. These carriers comprise nodular carrier beads of nickel characterized by surfaces of reoccurring recesses and protrusions that provide the particles with a relatively large external area. The diameters of the carrier particles can vary, but are generally from about 50 microns to about 1,000 microns, thus allowing the particles to possess sufficient density and inertia to avoid adherence to the electrostatic images during the development process. Carrier particles can possess coated surfaces. Typical coating materials include polymers and terpolymers, including, for example, fluoropolymers such as polyvinylidene fluorides as disclosed in U.S. Pat. Nos. 3,526,533, No. 3,849,186, and U.S. Pat. No. 3,942,979, the disclosures of each of which are totally incorporated herein by reference. The toner may be present, for example, in the two-component developer in an amount equal to about 1 to about 5 percent by weight of the carrier, and preferably is equal to about 3 percent by weight of the carrier.

Typical dry toners are disclosed in, for example, U.S. Pat. No. 2,788,288, U.S. Pat. No. 3,079,342, and U.S. Pat. No. Reissue 25,136, the disclosures of each of which are totally incorporated herein by reference. If desired, development can be effected with liquid developers. Liquid developers are disclosed, for example, in U.S. Pat. No. 2,890,174 and U.S. Pat. No. 2,899,335, the disclosures of each of which are totally incorporated herein by reference. Liquid developers can comprise aqueous based or oil based inks, and include both inks containing a water or oil soluble dye substance and pigmented inks. Typical dye substances are Methylene Blue, commercially available from Eastman Kodak Company, Brilliant Yellow, commercially available from the Harlaco Chemical Company, potassium permanganate, ferric chloride and Methylene Violet, Rose Bengal and Quinoline Yellow, the latter three available from Allied Chemical Company, and the like. Typical pigments are carbon black, graphite, lamp black, bone black, charcoal, titanium dioxide, white lead, zinc oxide, zinc sulfide, iron oxide, chromium oxide, lead chromate, zinc chromate, cadmium yellow, cadmium red, red lead, antimony dioxide, magnesium silicate, calcium carbonate, calcium silicate, phthalocyanines, benzidines, naphthols, toluidines, and the like. The liquid developer composition can comprise a finely divided opaque powder, a high resistance liquid, and an ingredient to prevent agglomeration. Typical high resistance liquids include such organic dielectric liquids as paraffinic hydrocarbons such as the Isopar® and Norpar® family, carbon tetrachloride, kerosene, benzene, trichloroethylene, and the like. Other liquid developer components or additives include vinyl resins, such as carboxy vinyl polymers, polyvinylpyrrolidones, methylvinylether maleic anhydride interpolymers, polyvinyl alcohols, cellulosics such as sodium carboxy-ethylcellulose, hydroxypropylmethyl cellulose, hydroxyethyl cellulose, methyl cellulose, cellulose derivatives such as esters and ethers thereof, alkali soluble proteins, casein, gelatin, and acrylate salts such as ammonium polyacrylate, sodium polyacrylate, and the like.

Any suitable development technique can be utilized to deposit toner particles on the electrostatic latent image on the imaging member surface. Well known development techniques include magnetic brush development, cascade development, powder cloud development, electrophoretic development, and the like. Magnetic brush development is more fully described, for example, in U.S. Pat. No. 2,791,949, the disclosure of which is totally incorporated herein by reference, cascade development is more fully described, for example, in U.S. Pat. No. 2,618,551 and U.S. Pat. No. 2,618,552, the disclosures of each of which are totally incorporated herein by reference, powder cloud development is more fully described, for example, in U.S. Pat. Nos. 2,725,305, No. 2,918,910, and U.S. Pat. No. 3,015,305, the disclosures of each of which are totally incorporated herein by reference, and liquid development is more fully described, for example, in U.S. Pat. No. 3,084,043, the disclosure of which is totally incorporated herein by reference.

The deposited toner image is subsequently transferred to a substrate, such as paper, transparency material, or the like. Transfer can be enhanced by applying an electrostatic charge to the rear surface of the substrate by a charging means such as a corona device. The deposited toner image can be transferred to a substrate such as paper or transparency material by any suitable technique, such as corona transfer, pressure transfer, adhesive transfer, bias roll transfer, and the like. Typical corona transfer entails contacting the deposited toner particles with a sheet of paper and applying an electrostatic charge on the side of the sheet opposite to the toner particles. A single wire corotron having applied thereto a potential of between about 5000 and about 8000 volts provides satisfactory transfer. After transfer, the transferred toner image can be fixed to the receiving sheet. Typical well known fusing techniques include heated roll fusing, flash fusing, oven fusing, cold pressure fusing, laminating, adhesive spray fixing, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A cylindrical preform of the form illustrated in FIG. 1A of polyethylene terephthalate (Eastman Kodak 7352 PET, $M_n=24,000$, $M_w=48,000$) having dimensions of 1.15 inches diameter, 5.0 inches length (excluding the threaded section; also excluding the dome section at the tip of the preform, the preform had a length of 4.45 inches), and 0.150 inch wall thickness having one sealed end was obtained from Eastman Chemicals, Kingsport, Tenn. The preform was axially centered in a one piece cylindrical mold 12 inches long and 4.3 inches in inside diameter of 6061 aluminum with an inner surface machined to a surface finish $R_a$ of 18 microinches. A preliminary experiment with an identical preform which entailed stretch blowing the preform without a mold indicated that the diameter stretch ratio was 3.7 to 1 and the axial stretch ratio was 2.6 to 1. Accordingly, the mold was selected to be slightly larger, i.e., using a diameter stretch ratio of 3.74 to 1 and an axial stretch ratio of 2.67 to 1; thus, the mold had inside dimensions of 4.3 inches in diameter and 12 inches in length. To seal the open end of the preform during air pressurization, the preform was mounted on a preform holder which in turn was attached to the mold. While in the mold, the preform was heated to a temperature of 100° C. by placing the mold, the preform, and the preform holder in a forced air convection oven. Subsequently, air was introduced into the preform through a high pressure air line via quick-release coupling at a pressure of 75 pounds per square inch to stretch the preform until it conformed to the inside of the cylindrical mold. The preform expansion proceeded with initial development of an aneurysm, which propagated through the length of the preform, followed by expansion until the preform contacted the inside mold surface. The expanded preform was then lowered to 40 pounds per square inch pressure in the mold and the mold, the preform, and the preform holder were placed into a forced air convection oven and heated to 220° C. for a period of 45 minutes to heat set the polyethylene terephthalate. Pressure was reduced in the preform prior to heat setting to compensate for air pressure buildup during heating. Thereafter, the mold, preform, and preform holder were removed from the oven and cooled in tap water, and the pressurized air was released from the expanded preform.

The preform was then removed from the mold. The resulting expanded and heat set preform had a wall thickness of 0.012 to 0.013 inch and exhibited excellent clarity and surface uniformity and smoothness. Subsequently, the expanded and set preform was heated to a temperature of 190° C. in a forced air convection oven for a period of 15 minutes, during which time the preform retained its structural integrity in that it did not deform. For comparative purposes, a preform identical to the one used to make the first expanded preform was stretch blow molded by the process described above in this example, but was not subjected to the heat setting step. Upon being placed in a forced air convection oven, this second non-heat set preform collapsed and shriveled immediately.

The expanded and heat set preform exhibited an ultimate tensile strength of 32,000 pounds per square inch in the circumferential direction.

EXAMPLE II

A cylindrical preform of the form illustrated in FIG. 1B of polyethylene terephthalate having dimensions of 3.42 inches diameter, 8.59 inches length, and 0.050 inch wall thickness having one sealed end was produced by an injection molding process using ICI Melinar N-5630 PET resin (intrinsic viscosity=0.63). The desired dimensions of the preform were based on the desired dimensions of the belt to be produced from the expanded preform, namely 42.00 inches in circumference or 13.37 inches in diameter, 14.37 inches wide, 0.004 inch thick. The required preform outside diameter was calculated using the equation $$OD_{belt} = (ID_{preform} + 0.5 t_{preform}) \times DSR$$

wherein $OD_{belt}$ is the outside diameter of the belt to be formed, $ID_{preform}$ is the preform inside diameter, preform is the preform wall thickness, and DSR is the diameter stretch ratio. A diameter stretch ratio of 4.0 was chosen, based on the recommendation of the PET manufacturer of a DSR of 3.8 or more. The preform thus had an outside diameter of 3.42 inches, a length of 6.69 inches (not including the dome portion—based on an axial stretch ratio of 3.0, calculated by 14.37 [desired belt width]÷3 [axial stretch ratio]=4.79 inches, with 1.9 additional inches added to account for end effects and trimming), and a thickness of 0.050 inch (determined from the desired final belt thickness multiplied by the two stretch ratios, i.e., 0.004×4.0×3.0=0.048). The preform was placed on a preform holder and heated to a temperature of 90° C. in a forced air convection oven for 7 minutes, followed by quickly removing the preform and preform holder from the oven and placing them in a one piece cylindrical mold 16.0 inches long and 13.414 inches in inside diameter (slightly larger than the desired finished belt diameter to account for thermal contraction of the belt during cooling). The mold was fabricated from 1025 mild steel and the inside surface was machined (lathe turned) to a surface finish $R_a$ of 18 microinches. Four toggle clamps were closed onto the preform holder and the high pressure air supply hose was connected to the air inlet pipe on the preform holder via a quick-release coupling. Air was then introduced into the preform at a pressure of 30 pounds per square inch to stretch the preform until it conformed to the inside of the cylindrical mold. The expanded preform was then maintained under 30 pounds per square inch pressure in the mold and the mold was heated to 150° C. with 3 kW silicone rubber band heaters mounted on the outer mold surface to heat set the polyethylene terephthalate. The temperature of 150° C. was the maximum temperature that could be achieved with these heaters within a reasonable period of time (i.e., 30 minutes or less). Once 150° C. was reached, the power to the heaters was turned off and the mold was allowed to cool by ambient cooling. The temperature of the mold and expanded preform dropped to about 60° C. in about 45 minutes, at which time the mold lid was removed and the expanded preform was removed from the mold and trimmed. The resulting heat set belt had a circumference of 42.025 inches and an average wall thickness of 0.0035 inch (actual wall thickness ranging from 0.0027 to 0.0042 inch, attributable to nonuniform preform wall thickness) and exhibited slight hazing or milkiness. The belt surface showed imperfections of the inside mold surface as well as dust particles caught between the expanded preform and the mold wall. The heat set belt exhibited an ultimate tensile strength of 29,000 pounds per square inch in the circumferential direction.

EXAMPLE III

A cylindrical preform of the form illustrated in FIG. 1B of polyethylene terephthalate having dimensions of 3.42 inches diameter, 8.59 inches length, and 0.060 inch average wall thickness having one sealed end was produced by an injection molding process using ICI Melinar N-5630 PET resin (intrinsic viscosity=0.63). The preform was of the same dimensions as that of Example II with the exception that the wall thickness was increased from 0.050 to 0.060 inch to result in a thicker belt. The preform was placed on a preform holder and heated to a temperature of 90° C. in a forced air convection oven for 8 minutes, followed by quickly removing the preform and preform holder from the oven and placing them into a one piece cylindrical mold 19.50 inches long and 13.402 inches in inside diameter (already heated to 140° C.). The mold was fabricated from case-hardened 1025 mild steel and the inner surface was ground to a surface finish $R_a$ of 12 microinches and chrome plated. The mold was heated to 140° C. so that the time to raise the mold temperature during the heat setting step could be shortened. Four hold-down toggle clamps were used to clamp the preform holder and preform into position on the mold apparatus. A high pressure air supply hose was connected to the air inlet pipe on the preform holder via a quick release coupling. Air was introduced into the preform at a pressure of 37 pounds per square inch to stretch the preform until it conformed to the inside of the cylindrical mold. The expanded preform was then maintained under 37 pounds per square inch pressure in the mold and the mold was heated to 170° C. over a period of 15 minutes to heat set the polyethylene terephthalate. The steel mold was heated with 14 kW cast aluminum heater bands mounted on the outer mold surface. Once the 170° C. temperature was reached, the power to the heaters was turned off and the mold was cooled by passing water through cooling coils in the heater bands. The temperature of the mold and expanded preform dropped to about 75° C. over a period of about 10 minutes, after which the mold lid was removed and the expanded preform was removed from the mold and trimmed. The resulting heat set belt had a circumference of 41.94 inches and an average wall thickness of 0.0045 inch (actual thickness ranging from 0.0036 to 0.0050 inch as a result of nonuniform preform wall thickness) and exhibited excellent clarity. The belt surface showed the imperfections of the inside mold surface as well as dust particles caught between the expanded preform and the mold wall.

EXAMPLE IV

A cylindrical preform of the form illustrated in FIG. 1B of polyethylene terephthalate containing 18 percent by weight of a barium sulfate filler and having dimensions of 3.42 inches diameter, 8.59 inches length, and 0.115 inch average wall thickness and having one sealed end was produced by an injection molding process using ICI Melinar B-79 PET resin. The preform was similar in dimension to the preform of Example II with the exception that the preform wall was increased to 0.115 inch to result in a belt with a thickness of 0.008 inch. The preform was placed on a preform holder and heated to a temperature of 90° C. in a forced air convection oven for 15 minutes. After the preform was heated to 90° C., it was quickly removed from the oven with the preform holder and placed into a one piece cylindrical mold 19.50 inches long and 13.262 inches in inside diameter (already heated to 140° C.). The mold was fabricated from 1025 mild steel and the inside surface was machined (lathe turned) to a surface finish $R_a$ of 18 microinches. The mold was heated to 140° C. so that the time to raise the mold temperature during the heat setting step could be shortened. Four hold down toggle clamps were used to clamp the preform holder and preform into position on the mold apparatus. A high pressure air supply hose was connected to the air inlet pipe on the preform holder via a quick release coupling. Air was introduced into the preform at a pressure of 37 pounds per square inch to stretch the preform until it conformed to the inside of the cylindrical mold. The expanded preform was then maintained under 37 pounds per square inch of pressure in the mold and the mold was heated to 1 70° C. over a period of 15 minutes to heat set the polyethylene terephthalate. The steel mold was heated with 14 kW cast aluminum heater bands mounted on the outer mold surface. Once the 170° C. temperature was reached, the power to the heaters was turned off and the mold was cooled by passing water through cooling coils in the heater bands. The temperature of the mold and expanded preform dropped to about 75° C. over a period of about 10 minutes, after which the mold lid was removed and the expanded preform was removed from the mold and trimmed. The resulting heat set belt was white in color and had a circumference of 41.44 inches and an average wall thickness of 0.0078 inch (the actual thickness ranged from 0.0068 to 0.0084 inch as a result of nonuniform preform wall thickness). The belt surface was very smooth and showed virtually no imperfections. The heat set belt exhibited an ultimate tensile strength of 22,300 pounds per square inch in the circumferential direction.

EXAMPLE V

A cylindrical preform of the form illustrated in FIG. 1B of ICI Melinar N-5630 PET polyethylene terephthalate containing 15 percent by weight of a conductive filler comprising carbon black and having dimensions of 3.42 inches diameter, 8.59 inches length, and 0.115 inch average wall thickness and having one sealed end is produced by an injection molding process. The preform is of the same dimensions as the preform of Example III. The preform is placed on a preform holder and heated to a temperature of 90° C. in a forced air convection oven for 8 minutes. After the preform is heated to 90° C., it is quickly removed from the oven with the preform holder and placed into a one piece cylindrical mold 19.50 inches long and 13.402 inches in inside diameter (already heated to 140° C.). The mold is fabricated from 1025 mild steel and the inside surface is ground to a surface finish $R_a$ of 12 microinches and chrome plated. The mold is heated to 140° C. so that the time to raise the mold temperature during the heat setting step can be shortened. Four hold down toggle clamps are used to clamp the preform holder and preform into position on the mold apparatus. A high pressure air supply hose is connected to the air inlet pipe on the preform holder via a quick release coupling. Air is introduced into the preform at a pressure of 37 pounds per square inch to stretch the preform until it conforms to the inside of the cylindrical mold. The expanded preform is then maintained under 37 pounds per square inch of pressure in the mold and the mold is heated to 170° C. over a period of 15 minutes to heat set the polyethylene terephthalate. The steel mold is heated with 14 kW cast aluminum heater bands mounted on the outer mold surface. Once the 170° C. temperature is reached, the power to the heaters is turned off and the mold is cooled by passing water through cooling coils in the heater bands. The temperature of the mold and expanded preform drops to about 75° C., after which the mold lid is removed and the expanded preform is removed from the mold and trimmed. The resulting heat set belt is black in color and conductive, thus rendering it suitable as a conductive substrate for electrophotographic or ionographic imaging members. It is believed that the belt surface will be very smooth and will show virtually no imperfections.

EXAMPLE VI

The seamless belt formed in Example III is made into a photoreceptor by first coating the outer surface of the belt with a layer of aluminum 150 microns thick by vacuum vapor deposition. Subsequently, the conductive aluminum layer is coated with a photogenerating layer comprising an azo photogenerating pigment by the process described in Example V of U.S. Pat. No. 4,797,337, the entire disclosure of said patent being totally incorporated herein by reference, wherein the photogenerating layer and charge transport layer are coated onto the conductive belt. The photoreceptor thus formed is then incorporated into an electrophotographic imaging test fixture and the imaging member is charged negatively with a corotron, followed by exposure of the charged member to a light image to form a negatively charged latent image on the member. The image is developed with a two-component developer comprising 2.5 percent by weight of a positively charged black toner prepared by mixing together 92 parts by weight of a styrene-n-butylmethacrylate resin, 6 parts by weight of Regal 330® carbon black from Cabot Corporation, and 2 parts by weight of cetyl pyridinium chloride and melt blending in an extruder, followed by micronization and air classification to obtain toner particles with an average diameter of 12 microns, and 97.5 percent by weight of a carrier prepared by solution coating a Hoeganoes Anchor Steel core with a particle diameter range of from about 75 to about 150 microns, available from Hoeganoes Company, with 0.4 parts by weight of a coating comprising 20 parts by weight of Vulcan carbon black, available from Cabot Corporation, homogeneously dispersed in 80 parts by weight of a chlorotrifluoroethylene-vinyl chloride copolymer, commercially available as OXY 461 from Occidental Petroleum Company, which coating was solution coated from a methyl ethyl ketone solvent. The developed image is transferred to Xerox® 4024 paper and affixed thereto by a heated fuser roll.

EXAMPLE VII

The seamless belt formed in Example III is made into a dielectric receiver suitable for ionographic imaging by first coating the inner surface of the belt with a layer of aluminum 150 microns thick by vacuum vapor deposition. The resulting belt has a conductive inner layer and a dielectric outer layer. The belt thus formed is incorporated into an ionographic imaging test fixture and a positively charged latent image is generated on the outer dielectric surface of the belt with an onographic writing head.

The latent image is developed with a negatively charged magenta liquid developer comprising an Isopar® G liquid vehicle, magenta toner particles in an amount of 1.5 percent by weight of the developer comprising about 15 percent by weight of Hostaperm Pink E pigment and about 85 percent by weight of poly(2-ethyl hexyl methacrylate) (Polysciences, Inc.), and OLOA 1200 in an amount of about 1 percent by weight of the solids content of the developer. Subsequently, the developed image is transferred to Xerox® 4024 paper.

The above process is repeated except that a negatively charged latent image is generated on the outer dielectric layer of the belt with the ionographic writing head and the latent image is developed with a two-component developer comprising 2.5 percent by weight of a positively charged black toner prepared by mixing together 92 parts by weight of a styrene-n-butylmethacrylate resin, 6 parts by weight of Regal 330® carbon black from Cabot Corporation, and 2 parts by weight of cetyl pyridinium chloride and melt blending in an extruder, followed by micronization and air classification to obtain toner particles with an average diameter of 12 microns, and 97.5 percent by weight of a carrier prepared by solution coating a Hoeganoes Anchor Steel core with a particle diameter range of from about 75 to about 150 microns, available from Hoeganoes Company, with 0.4 parts by weight of a coating comprising 20 parts by weight of Vulcan carbon black, available from Cabot Corporation, homogeneously dispersed in 80 parts by weight of a chlorotrifluoroethylene-vinyl chloride copolymer, commercially available as OXY 461 from Occidental Petroleum Company, which coating was solution coated from a methyl ethyl ketone solvent. The developed image is transferred to Xerox® 4024 paper and affixed thereto by a heated fuser roll.

EXAMPLE VIII

The conductive belt formed in Example V is made into a dielectric receiver suitable for Monographic imaging processes by coating the belt with a dielectric layer 0.001 inch thick comprising polyethylene terephthalate applied by a melt coating process. The resulting belt has a conductive inner layer and a dielectric outer layer. The belt thus formed is incorporated into an ionographic imaging test fixture and a positively charged latent image is generated on the outer dielectric surface of the belt with an ionographic writing head. The latent image is developed with a negatively charged magenta liquid developer comprising an Isopar® G liquid vehicle, magenta toner particles in an amount of 1.5 percent by weight of the developer comprising about 15 percent by weight of Hostaperm Pink E pigment and about 85 percent by weight of poly(2-ethyl hexyl methacrylate) (Polysciences, Inc.), and OLOA 1200 in an amount of about 1 percent by weight of the solids content of the developer. Subsequently, the developed image is transferred to Xerox® 4024 paper.

The above process is repeated except that a negatively charged latent image is generated on the outer dielectric layer of the belt with the ionographic writing head and the latent image is developed with a two-component developer comprising 2.5 percent by weight of a positively charged black toner prepared by mixing together 92 parts by weight of a styrene-n-butylmethacrylate resin, 6 parts by weight of Regal 330® carbon black from Cabot Corporation, and 2 parts by weight of cetyl pyridinium chloride and melt blending in an extruder, followed by micronization and air classification to obtain toner particles with an average diameter of 12 microns, and 97.5 percent by weight of a carrier prepared by solution coating a Hoeganoes Anchor Steel core with a particle diameter range of from about 75 to about 150 microns, available from Hoeganoes Company, with 0.4 parts by weight of a coating comprising 20 parts by weight of Vulcan carbon black, available from Cabot Corporation, homogeneously dispersed in 80 parts by weight of a chlorotrifluoroethylene-vinyl chloride copolymer, commercially available as OXY 461 from Occidental Petroleum Company, which coating was solution coated from a methyl ethyl ketone solvent. The developed image is transferred to Xerox® 4024 paper and affixed thereto by a heated fuser roll.

EXAMPLE IX

The conductive belt formed in Example V is made into a photoreceptor by coating the belt with a photogenerating layer comprising an azo photogenerating pigment by the process described in Example V of U.S. Pat. No. 4,797,337, the entire disclosure of said patent being totally incorporated herein by reference, wherein the photogenerating layer and charge transport layer are coated onto the conductive belt. The photoreceptor thus formed is then incorporated into an electrophotographic imaging test fixture and the imaging member is charged negatively with a corotron, followed by exposure of the charged member to a light image to form a negatively charged latent image on the member. The image is developed with a two-component developer comprising 2.5 percent by weight of a positively charged black toner prepared by mixing together 92 parts by weight of a styrene-n-butylmethacrylate resin, 6 parts by weight of Regal 330® carbon black from Cabot Corporation, and 2 parts by weight of cetyl pyridinium chloride and melt blending in an extruder, followed by micronization and air classification to obtain toner particles with an average diameter of 12 microns, and 97.5 percent by weight of a carrier prepared by solution coating a Hoeganoes Anchor Steel core with a particle diameter range of from about 75 to about 150 microns, available from Hoeganoes Company, with 0.4 parts by weight of a coating comprising 20 parts by weight of Vulcan carbon black, available from Cabot Corporation, homogeneously dispersed in 80 parts by weight of a chlorotrifluoroethylene-vinyl chloride copolymer, commercially available as OXY 461 from Occidental Petroleum Company, which coating was solution coated from a methyl ethyl ketone solvent. The developed image is transferred to Xerox® 4024 paper and affixed thereto by a heated fuser roll.

EXAMPLE X

The seamless belt formed in Example IV is cut into 18 narrower belts each about 1 inch wide. Eleven of these belts spaced at a distance of ¼ inch from each other are then incorporated into the recirculating document handler of a Xerox® 5090 imaging apparatus. The document handler is of the type that employs vacuum to hold papers in the handler against the belts. Paper documents are placed in the recirculating document handler and cycled through the apparatus to form copies. It is believed that the belts will exhibit no breakage, even after over 100,000 cycles. In addition, since the belts have no seams or discontinuities, little or no dirt accumulates on the belts, and accordingly the copies generated do not exhibit image defects such as dark lines.

Further, the belts track well on the rollers of the document handler, exhibiting little or no deviation or wandering on the rollers, in contrast to seamed belts, which may be joined so as to form imperfect cylinders, resulting in wandering or deviation from the rollers when the belt is used in a document handler.

Other embodiments and modifications of the present invention may occur to those skilled in the art subsequent to a review of the information presented herein; these embodiments and modifications, as well as equivalents thereof, are also included within the scope of this invention.

What is claimed is:

1. An imaging process which comprises (1) preparing an imaging member by a process which comprises (a) providing a preform comprising a polymeric material containing a conductive filler material formed to permit the introduction of a fluid under pressure into the perform; (b) heating the preform to an appropriate stretching temperature at or above the glass transition temperature of the polymeric material and below the melting temperature of the polymeric material; (c) placing the heated preform into a substantially cylindrical mold with a polished seamless inside surface; (d) introducing a fluid under pressure into the heated preform while maintaining the preform axially centered in the mold, thereby causing the preform to expand without contacting the molt surface; (e) subsequently causing to preform to expand until it contacts the mold surface; (f) heating the expanded preform to an appropriate heat setting temperature above the stretching temperature and below the melting temperature of the polymeric material while maintaining fluid pressure, said heat setting temperature being at least about 10° C. above the maximum temperature to which the preform will subsequently be exposed; (q) subsequently cooling the set preform, wherein the preform exhibits dimensional stability subsequent to exposure to the heating setting temperature and cooling; (h) trimming the set preform to the desire dimensions, thus forming a conductive seamless belt; and (i) applying a layer of a photogenerating material to the conductive belt; (2) electrostatically charging the imaging member thus formed; (3) forming an electrostatic latent image on the imaging member by exposing the charged member to light in an imagewise pattern; (4) developing the latent image; and (5) transferring the developed image to a substrate.

2. An imaging process which comprises (a) preparing a biaxially stretched conductive preform by (i) providing a preform comprising a polymeric material containing a conductive filler material formed to permit the introduction of a fluid under pressure into the preform; (ii) heating the preform to an appropriate stretching temperature at or above the glass transition temperature of the polymeric material and below the melting temperature of the polymeric material; (iii) placing the heated preform into a substantially cylindrical mold with a polished seamless inside surface; (iv) introducing a fluid under pressure into the heated preform while maintaining the preform axially centered in the mold, thereby causing the preform to expand without contacting the mold surface; (v) subsequently causing the preform to expand until it contacts the mold surface; (vi) heating the expanded preform to an appropriate heat setting temperature above the stretching temperature and below the melting temperature of the polymeric material while maintaining fluid pressure; and (vii) subsequently cooling the set preform; (b) trimming the set preform to the desired dimensions, thus forming a conductive seamless belt; (c) applying a layer of a dielectric material to the conductive seamless belt thus formed, thus forming an imaging member suitable for ionography; (d) forming an electrostatic latent image on the dielectric layer of the imaging member by ion deposition; (e) developing the latent image; and (f) transferring the developed image to a substrate.

3. An imaging process which comprises (a) preparing a biaxially stretched two-layered preform, wherein one of the layers is electrically conductive and one of the layers is electrically insulative, according to a process which comprises (1) providing a preform comprising a polymeric material containing a conductive filler material formed to permit the introduction of a fluid under pressure into the preform; (2) heating the preform to an appropriate stretching temperature at or above the glass transition temperature of the polymeric material and below the melting temperature of the polymeric material; (3) placing the heated preform into a substantially cylindrical mold with a polished seamless inside surface; (4) introducing a fluid under pressure into the heated preform while maintaining the preform axially centered in the mold, thereby causing the preform to expand without contacting the mold surface; (5) subsequently causing the preform to expand until it contacts the mold surface; (6) heating the expanded preform to an appropriate heat setting temperature above the stretching temperature and below the melting temperature of the polymeric material while maintaining fluid pressure, said heat setting temperature being at least about 10° C. above the maximum temperature to which the preform will subsequently be exposed; (7) subsequently cooling the preform, wherein the preform exhibits dimensional stability subsequent to exposure to the heat setting temperature and cooling; (8) trimming the set preform to the desire dimensions, thus forming a conductive seamless belt; and (9) applying a layer of a photogenerating material to the conductive belt, wherein the preforms contains an inner layer and an outer layer and the process results in formation of a biaxially oriented seamless belt with distinct inner and outer layers, wherein one layer of the belt is conductive and the outer layer of the belt is insulative, and wherein the photogenerating material is applied to the conductive layer; (b) trimming the set preform to the desired dimensions, thus forming an imaging member suitable for ionography; (c) forming an electrostatic latent image on the insulative layer of the imaging member by ion deposition; (d) developing the latent image; and (e) transferring the developed image to a substrate.

4. An imaging process which comprises (a) providing a preform comprising a polymeric material; (b) heating the preform to an appropriate stretching temperature at or above the glass transition temperature of the polymeric material and below the melting temperature of the polymeric material; (c) placing the heated preform into a substantially cylindrical mold with a polished seamless inside surface; (d) introducing a fluid under pressure into the heated preform while maintaining the preform axially centered in the mold, thereby causing the preform to expand without contacting the mold surface; (e) subsequently causing the preform to expand until it contacts the mold surface; (f) heating the expanded preform to an appropriate heat setting temperature above the stretching temperature and below the melting temperature of the polymeric material while maintaining fluid pressure; (g) subsequently cooling the set preform; (h) trimming the set preform to the desired dimensions, thus forming a seamless belt; (i) incorporating the seamless belt thus formed into a document handler in an electrophotographic copying apparatus; (j) causing at least one original document to be passed through the document handler and positioned for copying; and (k) producing at least one copy of the original document.

5. A process according to claim 4 wherein the heated preform is caused to stretch in the axial direction without contacting the mold surface by mechanical means prior to introduction of the fluid into the preform, and wherein the fluid causes the heated preform to stretch in the radial direction.

6. A process according to claim 4 wherein the preform is substantially flat prior to heating.

7. A process according to claim 5 wherein introduction of the fluid into the preform causes the heated preform to stretch in both the axial and radial directions.

8. A process according to claim 4 wherein the polymeric material is selected from the group consisting of polyethylene terephthalate, polypropylene, polyvinyl chloride, polystyrene, polyacrylonitrile, polyacetals, polyamides, polyether ether ketone, and mixtures thereof.

9. A process according to claim 4 wherein the polymeric material contains a filler.

10. A process according to claim 4 wherein the polymeric material is polyethylene terephthalate and the preform is heated to a temperature of from about 90° C. to about 115° C. prior to causing the preform to expand.

11. A process according to claim 4 wherein the polymeric material is polypropylene and the preform is heated to a temperature of from about 160° C. to about 165° C. prior to causing the preform to expand both axially and radially without contacting the mold surface.

12. A process according to claim 4 wherein the fluid is introduced into the heated preform at a pressure of from about 10 to about 300 pounds per square inch.

13. A process according to claim 4 wherein the polymeric material is polyethylene terephthalate and the preform is heated to a temperature of from about 150 to about 230° C. subsequent to expansion.

14. A process according to claim 4 wherein the preform is heated to the setting temperature within a period of 15 minutes or less.

15. A process according to claim 4 wherein the preform is cooled within a period of 15 minutes or less.

* * * * *